United States Patent
Fehrenbach et al.

(10) Patent No.: US 12,457,532 B2
(45) Date of Patent: Oct. 28, 2025

(54) USER EQUIPMENT SUPPORTING CONDITIONAL HANDOVERS TO CELLS OF A CELLULAR NETWORK AND A CELLULAR NETWORK SUPPORTING CONDITIONAL HANDOVERS

(71) Applicant: Fraunhofer-Gesellschaft zur Foerderung der angewandten Forschung e.V., Munich (DE)

(72) Inventors: Thomas Fehrenbach, Berlin (DE); Eiko Seidel, Sauerlach (DE); Cornelius Hellge, Berlin (DE); Thomas Wirth, Berlin (DE); Thomas Schierl, Berlin (DE); Sarun Selvanesan, Berlin (DE); Baris Göktepe, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 644 days.

(21) Appl. No.: 17/524,940

(22) Filed: Nov. 12, 2021

(65) Prior Publication Data
US 2022/0078684 A1    Mar. 10, 2022

Related U.S. Application Data

(63) Continuation of application No. PCT/EP2020/063356, filed on May 13, 2020.

(30) Foreign Application Priority Data

May 13, 2019   (EP) ...................... 19174229

(51) Int. Cl.
H04W 36/00    (2009.01)
H04W 36/30    (2009.01)
H04W 36/36    (2009.01)

(52) U.S. Cl.
CPC ... H04W 36/0058 (2018.08); H04W 36/0016 (2013.01); H04W 36/0064 (2023.05);
(Continued)

(58) Field of Classification Search
CPC ....... H04W 36/00837; H04W 36/0016; H04W 36/0058; H04W 36/305; H04W 76/19;
(Continued)

(56) References Cited

U.S. PATENT DOCUMENTS 11,582,663 B2 *  2/2023  Shi .................. H04W 36/00838
2015/0237516 A1  8/2015  Michel et al.
(Continued)

FOREIGN PATENT DOCUMENTS

CN    110073694 B *  4/2022  ............ H04W 36/24
EP    3609231 A1 *   2/2020  ............ H04W 76/27
(Continued)

OTHER PUBLICATIONS

Ericsson, R2-1900404, "Conditional Handover in NR", 3GPP TSG RAN WG2 #105, Athens, Greece.
(Continued)

*Primary Examiner* — Ayaz R Sheikh
*Assistant Examiner* — Louis Samara
(74) *Attorney, Agent, or Firm* — Perkins Coie LLP; Michael A. Glenn

(57) ABSTRACT

An embodiment of a user equipment supports conditional handovers to one or more cells of a cellular network.
The user equipment is configured to receive configuration data from the cellular network. The configuration data indicates for a plurality of target cells of the cellular network, conditions to trigger a conditional handover to any of the target cells.

(Continued)

The user equipment is further configured to check the conditions with respect to appliance, and, in case of appliance, trigger the conditional handover.

17 Claims, 12 Drawing Sheets

(52) U.S. Cl.
CPC ... *H04W 36/00838* (2023.05); *H04W 36/305* (2018.08); *H04W 36/362* (2023.05); *H04W 36/0072* (2013.01)

(58) Field of Classification Search
CPC ........... H04W 36/165; H04W 36/0083; H04W 36/0094; H04W 36/362; H04W 36/0079
See application file for complete search history.

(56) References Cited

U.S. PATENT DOCUMENTS

| | | | | |
|---|---|---|---|---|
| 2016/0014655 A1* | 1/2016 | Won | ................ | H04W 36/0079 455/438 |
| 2016/0285679 A1* | 9/2016 | Dudda | .............. | H04W 36/0058 |
| 2019/0387440 A1* | 12/2019 | Yiu | ................... | H04W 36/0072 |
| 2021/0168678 A1* | 6/2021 | Deenoo | ............. | H04W 36/305 |
| 2021/0360495 A1* | 11/2021 | Lovlekar | ............ | H04W 36/362 |
| 2022/0386197 A1* | 12/2022 | Hwang | .............. | H04W 36/362 |

FOREIGN PATENT DOCUMENTS

| | | | | |
|---|---|---|---|---|
| EP | 3563595 B1 * | 9/2023 | ........ | H04W 52/0261 |
| EP | 3766274 B1 * | 9/2024 | .......... | H04W 36/249 |
| JP | 2015518335 A * | 6/2015 | ............ | H04W 72/23 |
| WO | 2018143593 A1 | 8/2018 | | |
| WO | 2018171941 A1 | 9/2018 | | |
| WO | 2018230997 A1 | 12/2018 | | |
| WO | WO-2020061899 A1 * | 4/2020 | ............ | H04W 24/10 |

OTHER PUBLICATIONS

Ericsson, R2-1903515, "User plane aspects of conditional handover in NR", Discussion and Decision, 3GPP TSG RAN WG2 #105bis, Xi'an, China.

Ericsson, R2-1903516, "Configuration of Conditional handover", Discussion and Decision, 3GPP TSG RAN WG2 #105bis, Xi'an, China.

Ericsson, R2-1903517, "Triggering of Conditional Handover in NR", Discussion and Decision, 3GPP TSG RAN WG2 #105bis, Revision of R2-1900405, Xi'an, China.

Ericsson, R2-1903518, "Conditional Handover Execution in NR", Discussion and Decision, 3GPP TSG RAN WG2 #105bis, Xi'an, China.

Ericsson, R2-1903519, "Deconfiguration of conditional handover in NR", Discussion and Decision, 3GPP TSG RAN WG2 #105bis, Xi'an, China.

Ericsson, R2-1903520, "Conditional handover failures in NR", Discussion and Decision, 3GPP TSG RAN WG2 #105bis, Xi'an, China.

Intel Corporation, "Discussion of conditional handover", 3GPP TSG RAN WG2 Meeting #105bis, R2-1903443, XP051700788, Apr. 6, 2019.

LG Electronics Inc., "Consideration on CHO Failure", 3GPP TSG-RAN WG2 Draft; R2-1907998; XP051712246, May 3, 2019.

Lnterdigital Inc., "Triggers for Conditional Handover in LTE", 3GPP RAN WG2 Meeting #106, R2-1906393, XP051710708, May 3, 2019.

Mediatek Inc, "Conditional Handover Procedures", 3GPP TSG-RAN WG2 Meeting #104, R2-1816959, XP051480898, Feb. 11, 2018.

Fraunhofer HHI, Fraunhofer IIS, "Mobility Enhancements for Aerial UEs [online]", 3GPP TSG-WG2 Meeting #101 R2-1803384, internet <URL:http://www.3gpp.org/ftp/tsg_ran/WG2_RL2/TSGR2_101/Docs/R2-1803384.zip>, Feb. 15, 2018, Feb. 15, 2015, 7 pp.

Mediatek Inc, "Grouping and Automatic Reconfiguration for Handover Enhancement in LEO NTN [online],", 3GPP TSG-RAN WG2 Meeting #106 R2-1905702, Internet <URL:https://www.3gpp.org/ftp/tsg_ran/WG2_RL2/TSGR2_106/Docs/R2-1905702.zip>, May 2, 2019, May 2, 2019, 9 pp.

* cited by examiner

USER EQUIPMENT SUPPORTING CONDITIONAL HANDOVERS TO CELLS OF A CELLULAR NETWORK AND A CELLULAR NETWORK SUPPORTING CONDITIONAL HANDOVERS

CROSS-REFERENCES TO RELATED APPLICATIONS

This application is a continuation of copending International Application No. PCT/EP2020/063356, filed May 13, 2020, which is incorporated herein by reference in its entirety, and additionally claims priority from European Application No. EP 19174229.5, filed May 13, 2019, which is incorporated herein by reference in its entirety.

The present application is concerned with a concept for handovers in cellular networks. The present application is concerned with user equipments supporting conditional handovers to cells of a cellular network. The present application is concerned with cellular networks supporting conditional handovers. The present application is concerned with conditional handovers for vehicular networks and moving base stations.

BACKGROUND OF THE INVENTION

A non-terrestrial network provides wide area coverage to, for example, stationary or moving devices. In case of Low Earth Orbit (LEO) satellites, the base station (BS) or Next Generation NodeB (gNB) (in case of 5G) may move, for example, with high speed on deterministic routes over coverage areas. A LEO satellite may, for example, provide coverage for a certain area until, for example, a handover to the next moving satellite happens. In case, for example, the devices provide connectivity for a moving device, such as a train or an airplane, the user equipments (UE) as well as the gNBs will move, making, for example, mobility procedures even more critical. Note, the base station can also be a LTE base station, referred to as enhanced NodeB (eNB).

Conditional handover (CHO) is under discussion for 5G mobility enhancements. The objective of CHO is, for example, to improve the mobility robustness of the handover procedure. Conditional handover aims, for example, to avoid radio link failures (RLFs) due to, for example, a late measurement report that may not reach the network and/or, even when measurement reports are received, and the network decides to perform a handover, the handover command does not reach the UE before RLF happens and UE starts the re-establishment procedure.

For example, FIG. 1 illustrates exemplary key failure cases that might be avoided by CHOs.

One solution, for example, to improve mobility robustness is, for example, a conditional handover (CHO). In conditional handover, for example, the network configures the UE with triggering conditions. Based on, for example, the configurations obtained by the network, the UE may decide when a handover might be executed. When the conditions are fulfilled, the UE executes the handover without any further order from the network. The advantage of the procedure is, for example, that the handover (HO) command may be provided to the UE at an earlier stage, for example, before the radio conditions might have become poor, which may increase the chance of a successful transmission of the message. Furthermore, this CHO allows, for example, to perform the HO at an earlier time instance, although the current link might still support a decent link quality. If the HO condition is set accordingly, this may allow, for example, that a UE may experience a continuous quality-of-service (QOS), e.g. in terms of latency, reliability and throughput, while, for example, moving through a network.

An exemplary state-of-the-art CHO is illustrated in FIG. 2.

There is a need for further enhancements in the mobility robustness in a cellular network.

SUMMARY

According to an embodiment, a user equipment supporting conditional handovers to cells of a cellular network may be configured to: receive configuration data for configuring multiple conditional handovers as a sequence from the cellular network which indicates for a plurality of target cells of the cellular network, conditions to trigger a conditional handover to any of the target cells, check the conditions with respect to appliance, and, in case of appliance, trigger the conditional handover.

According to another embodiment, a cellular network supporting conditional handovers may be configured to: preemptively prepare, for one or more predetermined user equipments, for each of one or more target cells of the cellular network of the one or more predetermined user equipments, for a conditional handover of the user equipments to one or more respective target cells, and send configuration data for configuring multiple conditional handovers as a sequence to the user equipment which describes for each cell conditions to trigger a handover to the respective cell.

According to another embodiment, a method for supporting conditional handovers may have the steps of: receiving configuration data for configuring multiple conditional handovers as a sequence from a cellular network which indicates for a plurality of target cells of the cellular network, conditions to trigger a conditional handover to any of the target cells, checking, via a user equipment, the conditions with respect to appliance, and, in case of appliance, triggering the conditional handover.

According to another embodiment, a method for supporting conditional handovers may have the steps of: preemptively preparing, for one or more predetermined user equipments, for each of one or more target cells of a cellular network of the one or more predetermined user equipments, for a conditional handover of the user equipments to one or more respective target cells, and sending configuration data for configuring multiple conditional handovers as a sequence to the user equipment which describes for each cell conditions to trigger a handover to the respective cell.

An embodiment of a user equipment supports conditional handovers to one or more cells of a cellular network.

The user equipment is configured to receive configuration data from the cellular network. The configuration data indicates for a plurality of target cells of the cellular network, conditions to trigger a conditional handover to any of the target cells.

The user equipment is further configured to check the conditions with respect to appliance, and, in case of appliance, trigger the conditional handover. That is, in other words, the configuration data relates to a plurality of target cells of the cellular network which are, for instance, arranged alongside an estimated future route of the UE, and for each of this plurality of target cells, the configuration data may be indicative of one or more associated conditions the appliance of which shall continuously by determined by the UE and, if any of them (or a combination of them such as all) is met, this circumstance shall trigger the UE to commence the CHO to the respective target cell. Thus, the configuration data might be structured into parts, each relating to a certain target cell and comprising the one or more conditions associated with the respective target cell.

In an embodiment the user equipment is configured to delete a first part of the configuration data and keep a second part of the configuration data after a conditional handover is completed, or, alternatively speaking, responsive to having completed a handover to a certain one of the target cells, such as deleting the first part which relates to the conditional handover having been completed, (or to the corresponding target cell, respectively). Thereby, there is no need for the network to update the configuration data of the UE after any CHO conducted having been conducted, and the UE, in turn, is freed from checking conditions relating to target cells to which a CHO has already been done. Further, it might be unwanted that UEs may switch back, by a CHO, to target cells of the plurality of target cells, to which a CHO took place once.

The cellular network may act synchronously, that is, it may modify the configuration data synchronously, so that the configuration data is kept equal at both sides, at the UE and at the network side. To be more precise, the network might keep only those target cells prepared for a CHO, such as by allocating corresponding CHO details for the UE, to which the updated/synchronized configuration data yet relates.

For instance, modifying the configuration data may comprise a first part of the configuration data relating to the completed and/or finished handover to be removed from the configuration data, while a second the part of the configuration data relating to not yet completed or not yet finished handovers might be preserved.

According to embodiments the user equipment is, thus, configured to keep on the checking beyond a first triggering of the conditional handover. That is, in other words, the configuration data relates to a plurality of target cells of the cellular network which are thought of forming useful target cells to perform CHOs to even sequentially, one by the other, rather than purely alternatively to each other, so that the UE keeps on checking the conditions of the configuration data beyond a first CHO having been triggered based on these conditions.

According to embodiments, the first triggering relates to a conditional handover from a first cell to a second cell and the keeping on the checking includes checking conditions with respect to a conditional handover from the second cell to the first cell, i.e. back to the first cell which is then also one of the target cells which the configuration data refers to, and/or any other cell out of the target cells. Note that the conditions, for example, from the first cell to the second cell may differ from the conditions from the second cell to the first cell. In this manner, a switching back may be rendered possible, such as for the case the UE makes a U-turn and traverses an estimated future route reversely.

Additionally to checking, for example the trigger conditions related to the conditional handovers the UE can further check for non-configured target cells, i.e. can check for usefulness of handovers to any target cell not belonging to the plurality of target cells which the configuration data refers to, and in case a non-configured target cell is a suitable candidate, for example detected by triggering a measurement report or a different kind of configured/pre-configured trigger, inform the source cell about the suitable handover candidate, for example with a measurement report or a report which asks to reconfigure the conditional handover configuration. In this manner, a handover to the suitable cell can be initiated. In case of asking for an addition of a conditional handover to the target cells the configuration data relates to, the network, or the currently serving cell, may send a new configuration data or update to the existing configuration to the UE. It is also possible that a normal handover is initiated where the serving cell prepares the handover to the non-yet anticipated target cell.

According to embodiments, the user equipment is configured to trigger the conditional handover, which is available to the user equipment, only for a limited temporal interval indicated in the configuration data. In other words, a conditional handover to a certain one of the target cells may be conditioned by the configuration data, at least partially, in terms of a temporal interval, within which the conditional handover is allowed exclusively. Thus, the UE would have to check whether the current time falls into that temporal interval to check whether a CHO to the corresponding target cell is available or not. For more than one, or all of the target cells which the configuration data relates to, such a temporal interval may be given in the configuration data.

According to embodiments, the configuration data includes more than one limited and/or periodic temporal interval assigned to different target cells. A periodic temporal interval, such as a cyclic sequence of temporal intervals, can be defined, for example, when using satellites target cells, wherein the periodicity of the temporal interval is related to the orbital periodicity of the satellite target cell.

According to embodiments, the conditions to trigger, or trigger conditions, might comprise a service-dependent trigger, e.g. URLLC deleting, ignoring or deprioritizing common configurations or cells that do not support URLLC traffic. In other words, the conditions defined in the configuration data might favour certain target cells over other target cells such as over target cells of different service capacities, maybe dependent on the UE' characteristics. In even other words, the configuration data might be designed such that in case of two or more target cells being available for triggering a CHO thereto according to a first set of target cell individual conditions of each of these target cells, additional condition data in the configuration data which describes the target cells, may be used to select one of the available target cells, wherein this additional condition data describes the target cells technology.

A trigger might further be a policy-dependent trigger, for example, based on a charging model, wherein specific UEs might not be allowed to access a certain technology, e.g. cheaper modems or UEs of free of charge customers cannot access multi-RAT eNBs/gNBs. That is, for example, according to a condition defined in the configuration data, the UEs has to fulfil certain technology requirements for a CHO to certain target cells. In even other words, the configuration data might be designed such that in case of two or more target cells being available for triggering a CHO thereto according to a first set of target cell individual conditions of each of these target cells, additional condition data in the configuration data which describes the target cells, may be used to select one of the available target cells, wherein this additional condition data describes the target cells technology.

A trigger might further be a handover-failure trigger, wherein a UE can track the history of past unsuccessful handovers and can de-prioritize handovers to target cells which failed in the past and/or which are overloaded and/or which declined handovers in the past. This can also be a signalled trigger by the cellular network, e.g. the base station and/or the cell sends a trigger and adds a probability of success based on past analysis. This can be also comprised in the configuration data signalled by the cellular network, e.g. the base station and/or the cell sends a configuration data wherein a probability of success based on past analysis is attached to the trigger condition. In even other words, the configuration data might be designed such that in case of two or more target cells being available for triggering a CHO thereto according to a first set of target cell individual conditions of each of these target cells, additional condition data in the configuration data which prioritises or ranks the target cells among each other, may be used to select one of the available target cells, wherein this additional condition data ranks the target cells here in terms of handover success likelihood.

In an embodiment, the configuration data on the advantageous target cell and/or on a target cell with a first, primary, preference includes different trigger conditions than the configuration data on the backup target cell and/or on a target cell with a second, subsidiary, preference.

Furthermore, the trigger conditions of the backup target cell configuration data and/or the configuration data of the target cell with a second preference include an initial trigger condition according to which the handover with the advantageous target cell and/or a target cell with a first preference has failed, i.e. the one or more conditions for a CHO to that advantageous target cell had applied, but the handover finally failed.

This grouping or ranking can for example be done so as to
- Prefer cells that ensure service continuity and/or
- give preference to cells with more bandwidth and/or
- prefer 5G/LTE over 3G, GSM or other Radio Access Technology (RAT) and/or
- prefer less occupied cells or cells with less strain on its communication resources and/or
- prefer small cells or mm-wave operated cells over wider coverage macro cells that might operate at lower frequencies and/or
- prefer unlicensed cells over licensed cells.

These preferences can also be the opposite depending for example on policy, charging model, modem type or running services.

In an embodiment, the configuration data includes information on an order of the target cells, in which the user equipment is intended to perform, the conditional handovers. For instance, the UE could be ought to check the condition whether a CHO to a certain target cell would result in this target cell being the nth target cell among the plurality of target cells the configuration data relates to, for which a CHO is initiated. If not, this target cell is not available for a CHO.

In an embodiment, the user equipment is configured to update the configuration data according to configuration updates received from the cellular network. That is, new configuration data would not be transmitted to the UE in a self-contained manner, i.e. completely anew, but differentially to a current version of the configuration data at the UE.

In an embodiment the user equipment is configured to receive a configuration data comprising a first portion and a second portion. The first portion of the configuration data, comprising group specific or common parameters, such as LEO satellite routes, is received via broadcast or groupcast or multicast transmission, in order to reduce signalling overhead, and the second portion of the configuration data, comprising user specific or individual parameters, received via unicast transmission.

The first portion of the configuration data might be overwritten by the second portion of the configuration data, that is, the common parameters can be overwritten by the individual parameters.

According to embodiments, the user equipment is configured to trigger an update of the configuration data from the serving cell by sending a report, e.g. a measurement report, to the actual serving cell and/or to a new serving cell.

Sending a report to the actual serving cell may inform the actual serving cell when the user equipment cannot perform a handover to one or more potential target cells, if the user equipment is still connected to a serving cell, while sending a report to a new serving cell may inform a new serving cell about an erroneous handover configuration after the user equipment lost and re-connected to the cellular network.

The user equipment might also provide measurement reports and/or measurement data triggered by a serving cell or by a new serving cell, giving information about which triggers caused one or more previous handovers.

A measurement report is provided to the cellular network from the UE and it may contain several time related information and position related information to improve information about the expected whereabouts and expected time of arrival of the UE.

According to embodiments, the user equipment is configured to exchange context information with other nodes of a cellular network, which may relate to transceivers and may in particular be explained in connection with the user equipment (UE). Embodiments are not limited to the UE but relate, without limitation to other types of transmitters or transceivers, e.g., a transceiver comprising any item and/or device provided with network connectivity enabling the item and/or device to communicate using the wireless communication network, e.g., a sensor or actuator.

For example, a mobile or immobile base station, may comprise any transmission/reception point, TRP, enabling an item or a device to communicate using the wireless communication network, the item or device being provided with network connectivity to communicate using the wireless communication network.

A further embodiment of a cellular network supports conditional handovers, configured to preemptively prepare, for one or more predetermined user equipments, for each of one or more target cells of the cellular network of the one or more predetermined user equipments, for a conditional handover of the user equipments to one or more respective target cells identified by cell identities.

The cellular network is further configured to send configuration data to the user equipment which describes for each cell the conditions to trigger the handover to the respective cell.

The cellular network is preemptively preparing for a handover of the inventive user equipments to the respective cell or simply preparing a future handover possibly performed by the user equipment to the respective cell. The preemptive preparation may involve attributing one of an available IDs to the user equipment. The ID being included, for instance, in a user equipment individual portion of the configuration data.

The preemptive preparation can for example include
- Transferring and storing the User context, e.g. RRC context and/or
- Reserving a user ID, e.g. RNTI and/or
- Reserving a RACH preamble and/or
- Reserving resources and/or
- Routing and/or duplicating packets to one or more prepared target cells and/or Preparing edge cloud functions and/or Checking and or preparing QoS for services running.

The embodiment of a cellular network supporting conditional handovers, for example for vehicular networks and/or for moving gNBs, will bring, without limitation, several new ideas, such as:

a CHO Configuration data is not removed after CHO execution, a configuration data of CHO for multiple successive cells, a provision of CHO configuration data via broadcast/multicast signalling, a CHO configuration to be Active or Inactive initially, asking target gNBs or target cells for sequential CHO configuration towards target cells, providing sequential CHO configuration towards target cells, informing the UE in case Sequential CHO is not possible, inform previous cell or previous serving cell and future cells or potential target cells about CHO completion, providing the UE's CHO configuration data as part of the UE context information, and the UE reconnects to the network in case CHO is not executed as expected.

It should be noted that any embodiments as defined by the claims can be supplemented by any of the details (features and functionalities) described in the above mentioned chapters.

Also, the embodiments described in the above mentioned chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in a user equipment and in a cellular network. Thus, any of the features described herein can be used in the context of a user equipment and in a cellular network.

Also, any of the features and functionalities described herein can be implemented in hardware or in software, or using a combination of hardware and software.

Further embodiments of the inventive user equipment and/or of the inventive cellular network will be defined by the enclosed claims.

BRIEF DESCRIPTION OF THE DRAWINGS

Embodiments of the present invention will be detailed subsequently referring to the appended drawings, in which.

DETAILED DESCRIPTION OF THE INVENTION

In the following, different inventive embodiments and aspects will be described.

It should be noted that any embodiments as defined by the claims can be supplemented by any of the details (features and functionalities) described herein.

In addition, the embodiments described herein can be used individually, and can also be supplemented by any of the features in the description, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in a user equipment and in a cellular network. Thus, any of the features described herein can be used in the context of a user equipment and/or of a cellular network and/or in the context of conditional handovers (CHO) for vehicular networks and moving Next Generation NodeBs (gNBs).

Also, any of the features and functionalities described herein can be implemented in hardware or in software, or using a combination of hardware and software, as will be described in the section "implementation alternatives".

Figure 1A:
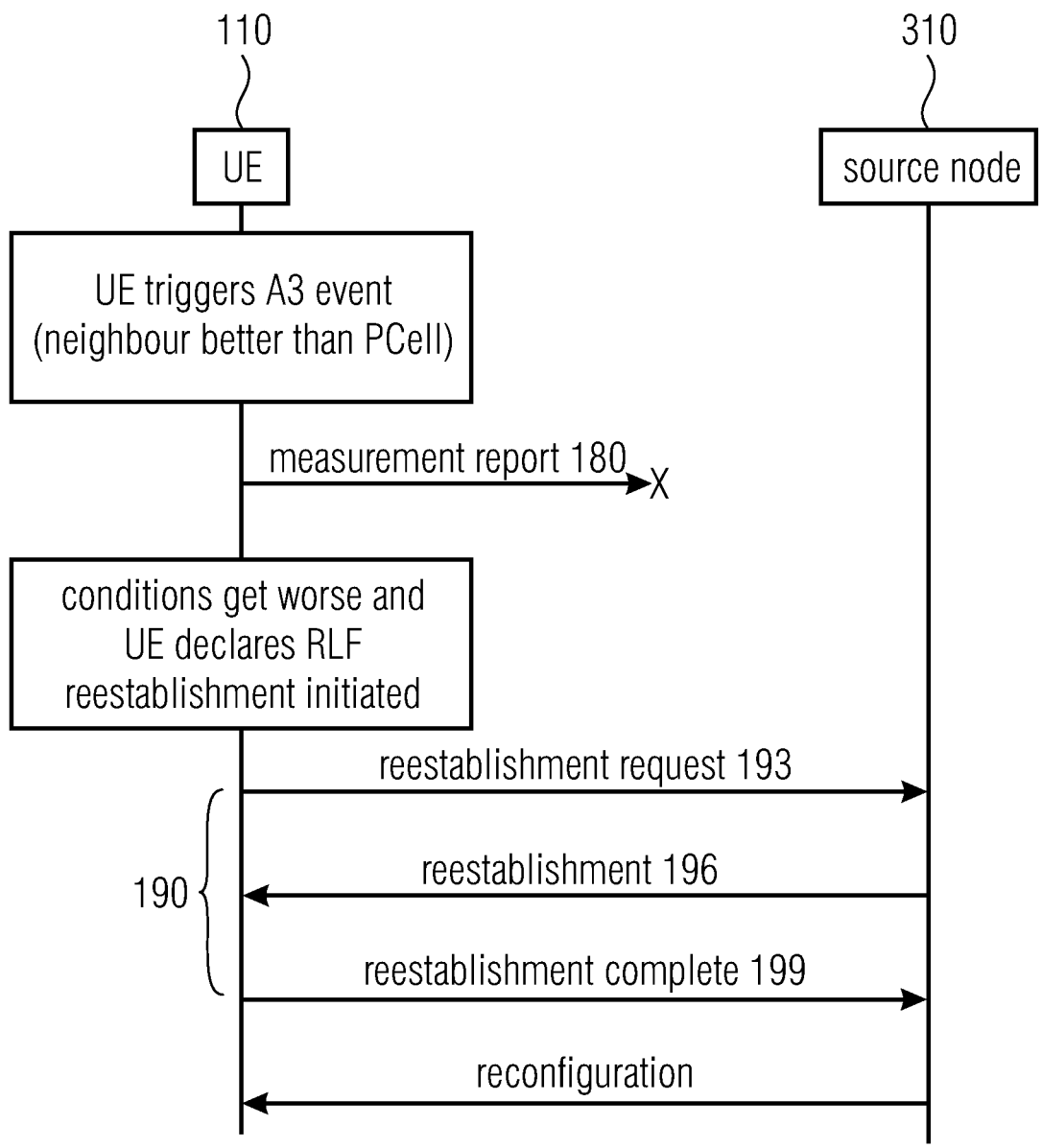
FIG. 1a) shows a schematic communication diagram of a handover failure case.
Figure 1B:
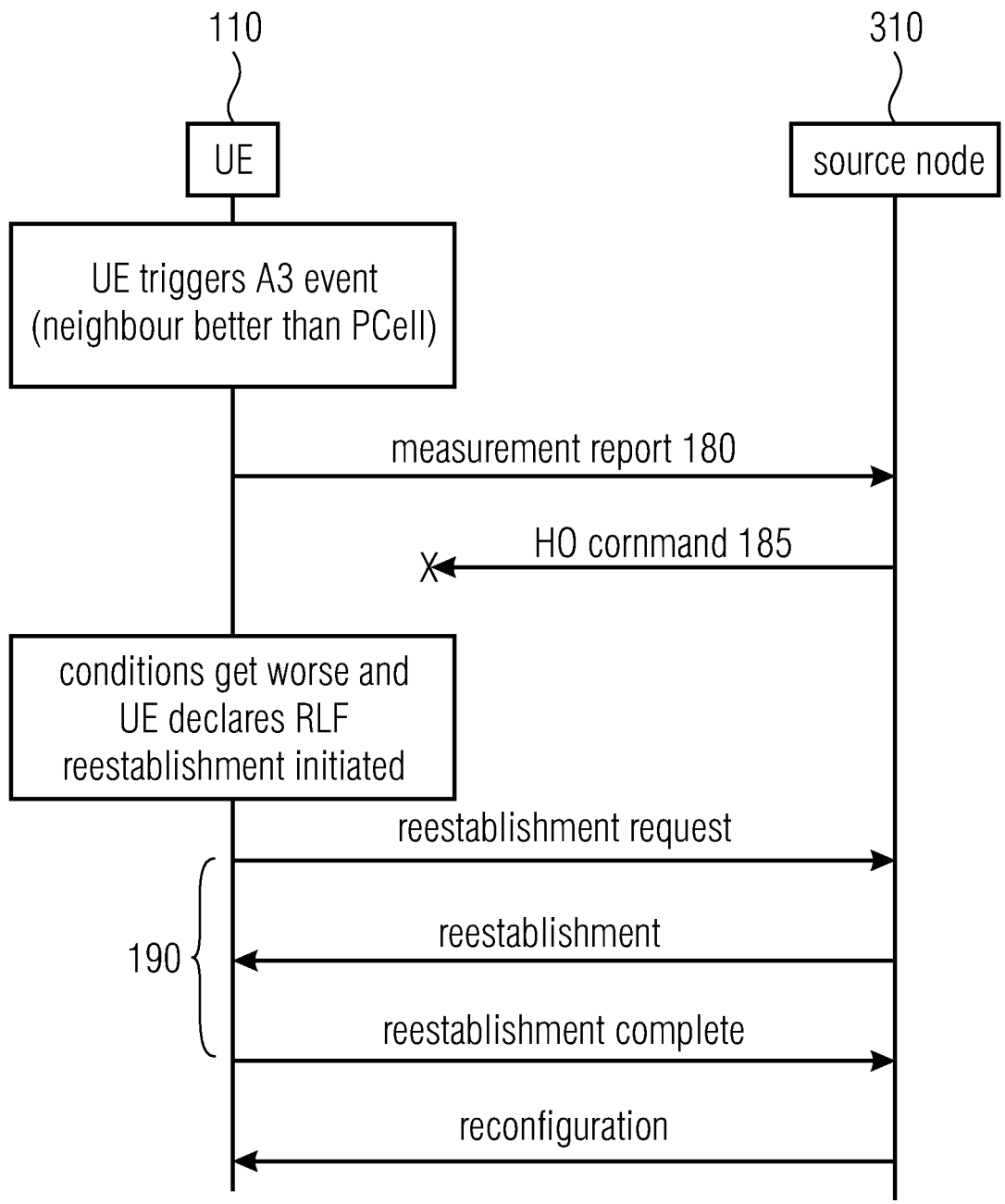
FIG. 1b) shows a schematic communication diagram of another handover failure case.

As explained above, a conditional handover aims, for example, to avoid radio link failures (RLFs) illustrated in FIG. 1, FIG. 1 shows two exemplary failure cases, 100a on FIGS. 1a and 100b on FIG. 1b, which might be avoided by a conditional handover (CHO).

FIG. 1a shows a schematic representation of a failure case 100a comprising a user equipment 110, a source node or a base station 310, and a communication and/or data exchange between the UE 110 and the source node 310.

The failure case 100a comprises a step in the communication between the UE 110 and the source node 310 wherein the UE 110 intends to send a measurement report 180 to the source node 310 but the measurement report does not reach the base station 310.

As the UE 110 does not receive a response from the source node 310 and/or the conditions become worse, the UE 110 declares a radio link failure (RLF) and initiates a reestablishment process 190. A reestablishment process 190 comprises a reestablishment request 193, sent from the UE 110 to the source node 310; a reestablishment acknowledged message 196, sent from the source node 310 to the UE 110; and a reestablishment completed message 199, sent from the UE 110 to the source node 310. As a last step, the source node 310 provides reconfiguration data to the UE 110.

Another failure case 100b is represented by FIG. 1b. Similar to FIG. 1a, FIG. 1b comprises a UE 110, a source node 310 and the communication between the UE 110 and the source node 310. In contrast to FIG. 1a, the measurement report send by the UE 110 reaches the source node 310 and/or the network. The network decides to perform a handover and sends out a handover command 185 to the UE 110 from the source node 310.

In the case of FIG. 1b, the handover command does not reach the UE 110. Similarly to FIG. 1a, the UE 110 does not receive a response and/or the conditions of the UE 110 become worse and the UE 110 declares a RLF and initiates a reestablishment process 190 as described in FIG. 1a.

Figure 2:
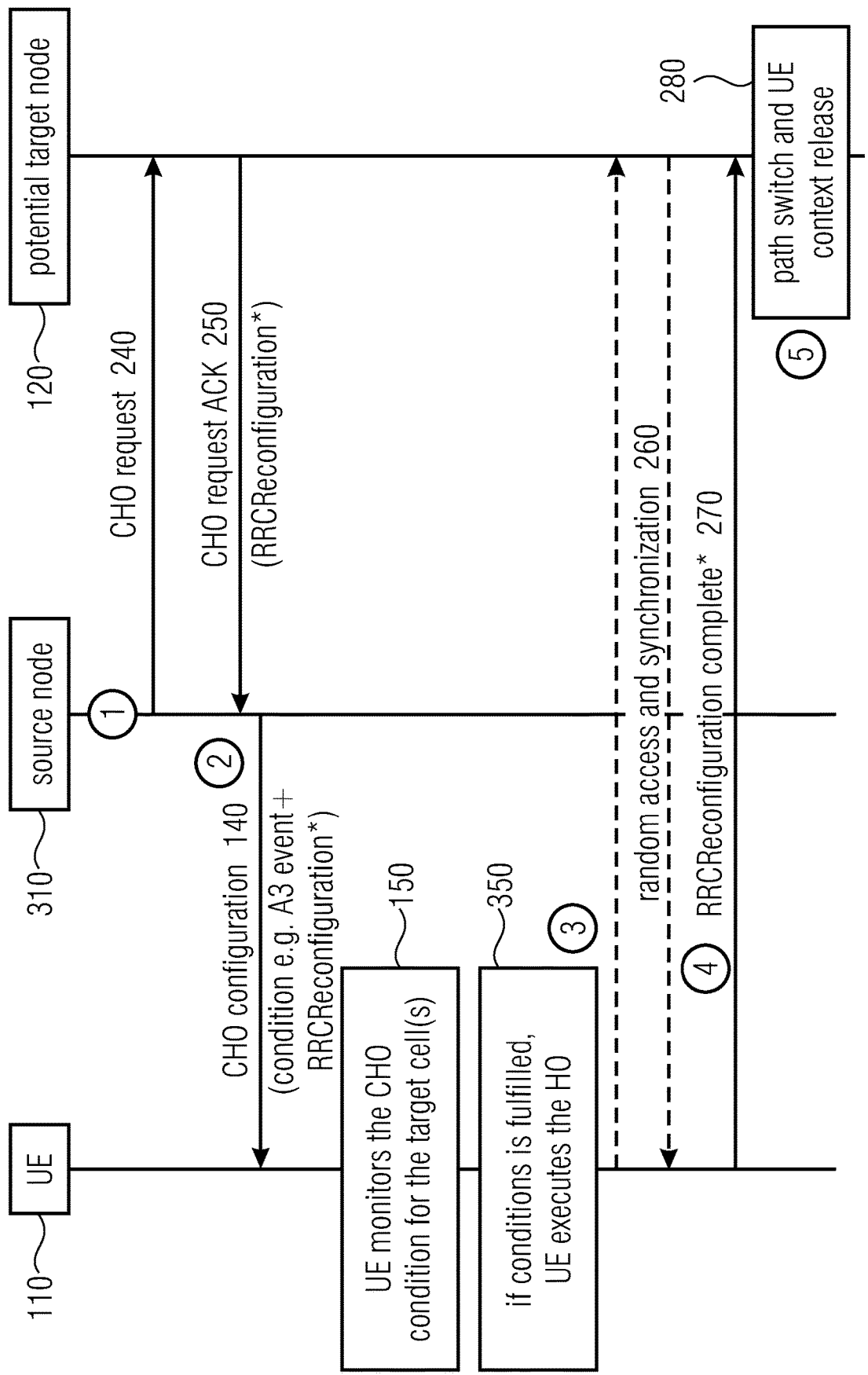
FIG. 2 shows a schematic communication diagram of a prior-art conditional handover.

A potential solution for the failure cases described in FIG. 1a, FIG. 1b, is improving mobility robustness with a conditional handover (CHO) illustrated in FIG. 2. FIG. 2 shows a schematic representation of the communication and/or data exchange between a UE 110, a source node 310 and a potential target node 120.

A first step of a conditional handover (CHO) comprises sending a CHO request 240 from a source node 310 to a potential target node 120. The CHO decision is, for example triggered earlier, for example, by a higher layer decision, or can be based on source node 310 requests or the potential target node 120 may review the possibility of a CHO, for example, it may execute an admission control.

After a successful admission control, the potential target node 120 sends a CHO request acknowledgement 250, if useful, with further RRC reconfiguration data, to the source node 310.

As a next step, the source node 310 provides 140 the UE 110 with CHO configuration data. The CHO configuration data comprises trigger criteria or trigger conditions or conditions and respective RRC reconfiguration data of a potential target node 120.

The UE 110 continuously monitors, or at least frequently checks 150 the CHO trigger conditions or conditions for one or more target cells 120. If a trigger condition is met, or a subset of a set of trigger conditions is fulfilled the UE 110 executes 350 the handover (HO) which includes a random access and synchronization procedure 260 between the UE 110 and the given potential target node 120. The UE 110 informs the potential target node 120 as the RRC reconfiguration is completed by an RRC reconfiguration completed messages 270.

As the last step, the target node 120 informs the serving source node or the source base station 310 and/or the core network indicating a successful CHO execution. As the source node 310 releases the UE 110 context, the path switch is completed 280. Further, the access and mobility management function (AMF) gets to know the new location of the UE 110 and/or the user plane function gets to know the new target cell 120 in order to forward packets to the new target cell 120.

In other words, the steps of the state-of-the art CHO can be described as follows:

1. As a first step, the source qNB 310 makes decision to configure a CHO.
    The CHO decision can be based on, for example, UE 110 measurements, whereas a CHO configuration may be triggered earlier, compared to a regular HO configuration.
    The CHO decision can also be based on, for example, a higher layer decision, e.g. based on:
        the load of surrounding base stations, and/or
        the service type, and/or
        the application requirements on the UE 110, base station 310 or network, and/or
        another UE which sends a trigger via sidelink (SL) interface, and/or
        the source node is triggered by an entity in the network or Internet, e.g. a V2X application server or road side unit (RSU).
    The CHO decision can be based on source node 310 requests, for example, CHO to target cell 120, and provides the UE 110 configuration.
    Or the target node 120 makes, for example, admission control and, if it is successful, provides the cell configuration to the source node 310, which the source node 310 may forward to the UE 110 in the CHO configuration message 140.
2. As a second step, the source qNB 310 provides CHO configuration comprising
    a CHO trigger criteria and configuration of the target cells to a UE 110.
3. As a third step, the UE 110 makes CHO decision
    once condition is met, for example UE 110 may accesses target cell, or
    a subset of a set of conditions is met, e.g. it can be a set of rules.
4. As a fourth step, the UE 110 sends handover completion message
    by sending RRC Reconfiguration Complete message to the new source cell
    and the CHO configuration is released.
5. As a last step, the target cell 120 informs the source gNB 310 and core network or the cellular network.
    A successful CHO execution indicated.
    The target node 120 informs the source gNB 310, making the source node 310 release the UE 110 context.
    The target informs the core network, in particularly:
        the AMF gets to know the new location of the UE 110, and/or
        the UPF gets to know a new target cell 120 (makes path switch) to forward packets to the new target cell 120.

As shown in FIG. 2, in a state-of-the-art CHO, only one, or differently speaking, the next handover candidate is provided. Multiple candidates may be provided, but from the same, the current serving and/or source cell 310. This means, for example, after the CHO is executed and the CHO is finalized, the UE is left without a CHO configuration until the next CHO configuration takes place. For example, in case of very fast cell changes the time may not be enough to, for example, exchange a lot of signalling and the overhead associated to such procedures might be minimized.

In general, for example, the configuration of a CHO is only valid for a certain period of time and only for a single handover from the current serving cell to one or more new cells or target cells. This means that the CHO is configured, for example, in each serving cell individually. Once, for example, a HO was executed or completed, the next CHO will need to be configured.

For example, for terrestrial CHO, it is important, for example, that the CHO configuration is removed or deleted at some point in time. This is commonly done, for example, by explicit signalling from the cell or from the gNB of a cell, after expiry of a validity timer or, for example, after a successful, completed handover. In a regular procedure, the CHO configuration is removed or deleted (in step 4 on FIG. 2) after successful completion of the CHO.

For example, trains, airplanes or cars may move with high speed on deterministic routes, such as, for example train tracks, plane routes, highways and/or streets. The network providing connectivity for respective devices can predict, for example, the user mobility path or route not only for the next cell, but also for the next couple of cells.

In the new scenario above, for example, the network might have a good knowledge of the UE or the gNB mobility or route along deterministic paths along multiple cells.

One idea which embodiments of the present application are based on, is, for example, to configure multiple sequential CHO handovers and therefore not to remove or partly remove the CHO configuration directly after a successful, completed HO or CHO. Thus enhancing the Conditional Handovers (CHO) described above.

Embodiments unveil ideas to, for example, configure multiple cells over a user equipment (UE) mobility path or route as handover candidates in order to, for example, minimize over the air signalling and/or, for example, to ensure a reliable handover procedure or a multiple sequential conditional handover procedure at high velocities. Instead of signalling individual handover candidates on a per handover basis, signalling along a path or route of cells/handovers is provided. A path can be described by coordinates, e.g. GPS coordinates, and can be on a 2D plane, or on a 3D plane, the latter containing a parameter for the height of the UE. Furthermore, the path can also contain a motion vector, which contains information with respect to the speed and/or acceleration and/or direction of the moving UE.

Figure 3:
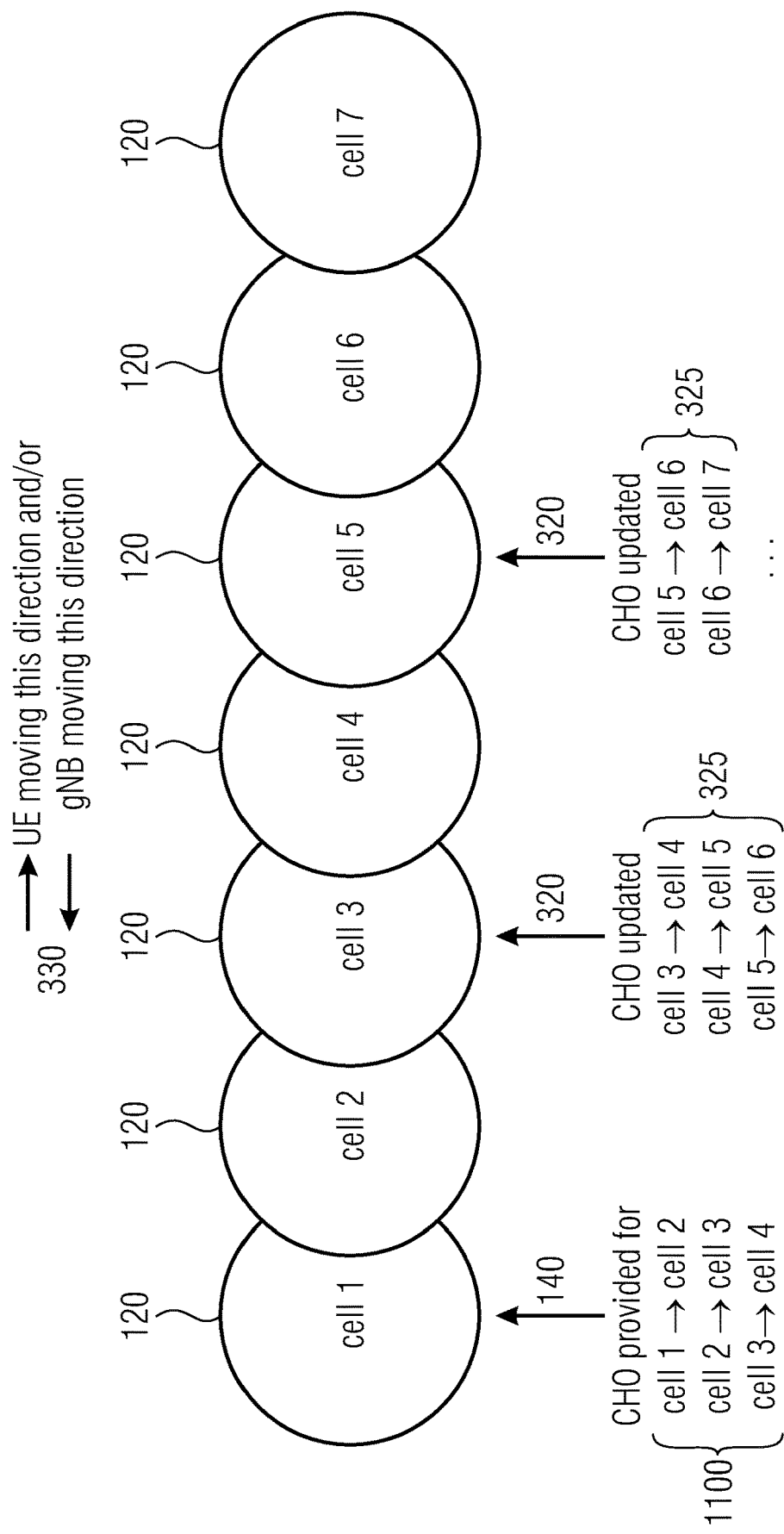
FIG. 3 shows a schematic diagram of an embodiment of a cellular network with multiple sequential conditional handovers.

A schematic diagram of an embodiment comprising a moving UE 110 and/or moving gNBs 120, represented by directional arrows 330 is shown in FIG. 3. FIG. 3 further comprises seven target cells 120, cell 1-7, of a cellular network, aligned on the mobility path or on the expected future route of the moving UE 110.

The UE 110 of FIG. 3 is configured to receive a configuration data 1110 from cell 1. The configuration data 1100 comprises multiple sequential CHO trigger conditions and respective CHO configuration information or data for the conditional handovers from cell 1 to cell 2, from cell 2 to cell 3 and from cell 3 to cell 4. The CHO configuration data 1110 comprises not only trigger conditions and configuration information or data of a handover from the current serving cell to a next potential target cell, but further trigger conditions and configuration data of handovers as well, in which the current serving cell is not involved.

As the UE 110 is moving on the mobility path or route from cell 1 to cell 4, the UE 110 monitors or checks the conditions or trigger conditions of configuration data 1100 and if the trigger conditions are fulfilled, or in case of an appliance of the conditions, the UE 110 executes a CHO with the help of the CHO configuration data or at least the UE 110 triggers the CHO.

As the UE 110 reaches cell 3, the configuration data 1100 of the UE 110 gets updated 320, the UE 110 receives a CHO update data 325 from cell 3. The CHO update data or the CHO configuration update data 325 comprises further trigger conditions and configuration information or data of handovers from cell 3 to cell 4, from cell 4 to cell 5, and for cell 5 to cell 6. For example, the communication of the moving UE 110 is made more reliable by the UE 110 receiving a CHO configuration update 320 before reaching the last cell of the configuration data 1100 provided by, for example, the last update, or by cell 1.

As the UE 110 is moving on the mobility path or route from cell 3 to cell 6, the UE 110 monitors the trigger conditions of configuration data 1100. Whenever trigger conditions are fulfilled, the UE 110 executes or completes a CHO according to the CHO configuration data.

As the UE 110 reaches cell 5, the UE 110 gets updated 320 by cell 5 with a CHO configuration update data 325 comprising further trigger conditions and configuration data of the handovers from cell 5 to cell 6 and from cell 6 to cell 7. The configuration update data 325 may comprise a new version or only a changed portion or a delta portion of the configuration data 1100.

In an embodiment, for example, with a single CHO configuration or with a single CHO configuration data 1100, multiple sequential CHO configurations, that is multiple configurations for sequential cell changes, are provided. For example, an explicit indication in the signalling may indicate that, for example, a sequential CHO configuration is provided.

The configuration may or may not be active at the initial state. This behaviour may be hard coded in the specification, the one or the other, or may be configurable by signalling. In the latter case, there might be a bit in the RRC message informing the UEs if, for example, a CHO is already activated after configuration and/or, for example, if it still needs to be activated after configuration.

In one alternative embodiment, for example, the CHO configuration or the CHO configuration data is only deleted once the mobility pattern deviates from the expected mobility pattern or expected future route. The CHO configuration is, for example, either removed after some timer expiry, e.g. too late handover, or after some configured events, e.g. an unexpected handover to a different cell or to a target cell not contained in the CHO configuration data 1100. In case such an event happens at the UE side, for example, the UE may contact the network or cellular network to inform the network about this or in case the event happens at the networks side, the network may configure the UE with new handover setting or with new CHO configuration data 1100.

In this case, for example, three sequential CHOs. In other words, the UE receives a CHO configuration data with CHO conditions and CHO configuration information of three sequential CHOs. In an embodiment, for example, the UE performs or completes the first CHO from Cell 1 to Cell 2, it keeps the following CHOs, or keeps checking the appliance of the trigger conditions to Cell 3 and Cell 4. In this case, multiple CHOs can be executed with, for example, a single configuration or CHO configuration data and the UE, even directly after the CHO execution or completion has, for example, a CHO or CHO configuration data for the next CHO configured. This may increase the reliability and may reduce overall signalling overhead.

In another embodiment of the inventive apparatus, different thresholds and signal levels can be assigned for each configured CHO handover, for example as CHO trigger conditions, e.g. CHO from Cell 1→Cell 2 may happen with a different threshold and/or signal level than a CHO from Cell 2→Cell 3.

The whole mobility procedure can be, for example, made very reliable by configuring the next CHO sequence or by updating the CHO configuration data before the last CHO is reached. For instance, the CHO update is received in Cell 3, although CHO is configured or the CHO configuration data comprises trigger conditions and CHO configuration information up to Cell 4. Even if CHO configuration or the update of the CHO configuration data in Cell 3 fails, the network can still, for example, provide the CHO configuration or the update of the CHO configuration data in Cell 4 and has, for example, thus some reliability margin.

This marking or feature also allows the UE and/or the network, for example, to react in case the new CHO configuration or CHO configuration data, e.g. in Cell 3 cannot be configured or updated successfully. For instance, the UE may inform the application to react, e.g. a message to higher layer may be given and/or the user in a car that is driving autonomously may be informed, that, for example, he/she should overtake the steering.

For instance, in case of a Cloud RAN the cells for which the sequential CHO is configured or the potential target cells may belong to a Cloud RAN where the control plane functions (RRC+RRM) are, for example, centralized. This might avoid extensive inter-gNB signalling towards a set of target gNBs, for example, before a CHO can be configured.

CHO configuration parameters, per sequential cell change, provided to the UE may, for example, contain:
  Physical cell identities, and/or
  Trigger thresholds or trigger conditions (e.g. a certain RSRP, RSRQ, SINR, RSSI), and/or
  Reference signals to measure on (SSB, CSI-RS or both, DMRS), and/or
  Beam information, and/or
  Averaging information, and/or
  Target cell configuration, and/or
  Resource pool configurations or usage/utilization for V2X.

After a successful CHO execution, the new cell or the new serving cell and/or new target cell may, for example, add some criteria, e.g. extend the path or route, modify or release CHO configurations from the sequential list or from the CHO configuration data. To save signalling, for example, a delta or a changed portion signalling may be provided, signalling only configuration entries that were changed.

Figure 4:
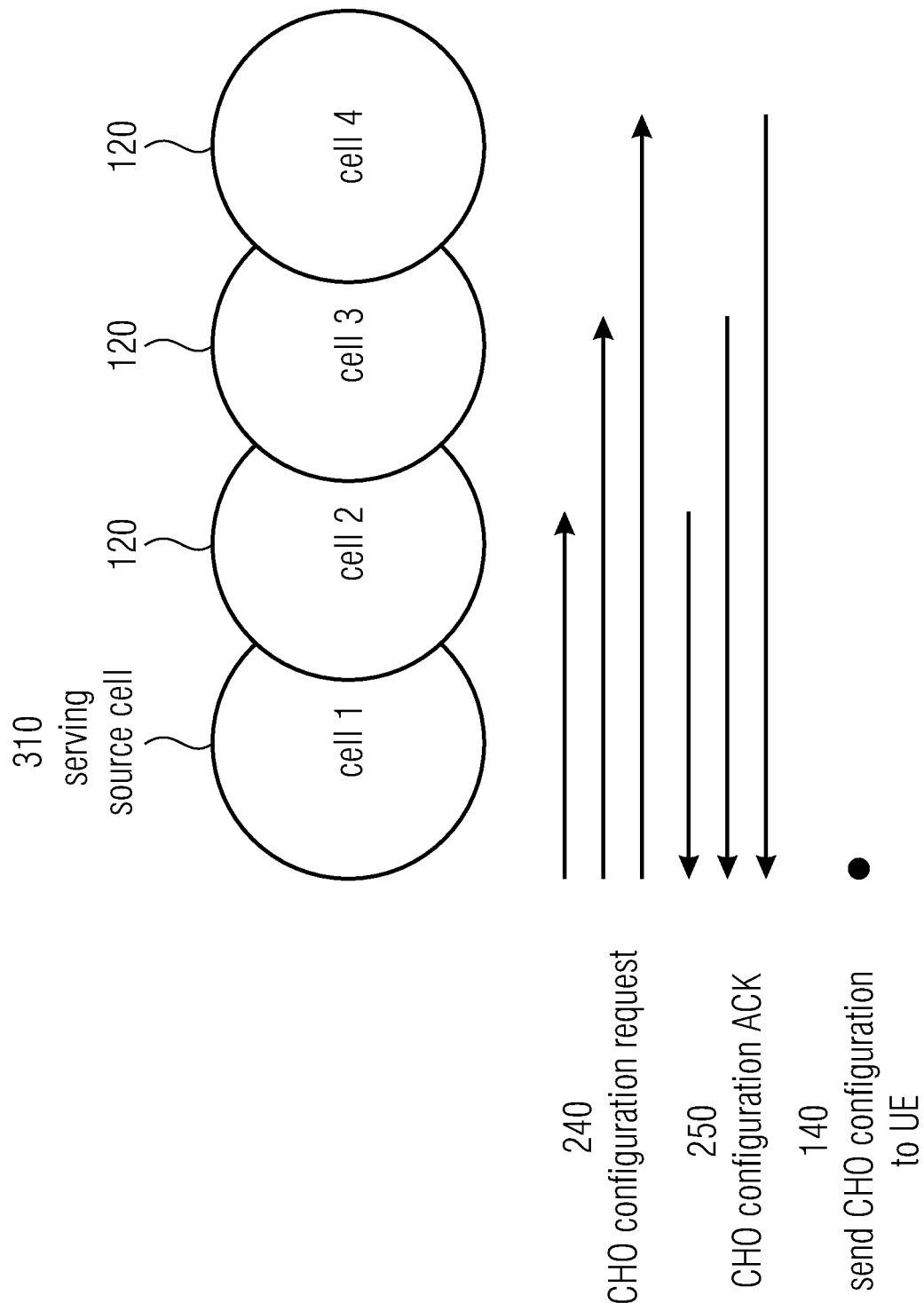
FIG. 4 shows a schematic diagram of an embodiment of a preparation for a CHO configuration in a sequential conditional handover.

FIG. 4 shows a schematic diagram of an embodiment of a preparation for a CHO configuration in a sequential conditional handover, comprising the first four cells of FIG. 3, cell 1-4, along a mobility path of a moving UE 110, wherein cell 1 is a serving or a source cell 310 or a serving source cell and further cells, cell 2-4, are potential target cells 120.

Similarly to the first two steps of the state-of-the-art CHO on FIG. 2, the serving cell 310 on FIG. 4 sends out CHO configuration requests 240, but not just to a neighboring cell, cell 2, but also to cells further away in mobility path or route of the UE 110, such as to cell 3 or to cell 4. That is, the serving cell 310 sends CHO configuration request 240 for conditional handovers in which the serving cell 310 is not even involved, such as a CHO between cell 3 and cell 4.

The potential target cells 120 can review the possibility of a potential CHO, such as doing an admission control, and/or reserve resources and prepare for a CHO. If a CHO is possible, the potential target cell 120, such as cell 2, cell 3 and/or cell 4, are acknowledging the CHO configuration request 240 with a CHO configuration acknowledged message 250. The CHO configuration acknowledged message 250 may contain further information, such as CHO configuration information or data.

After receiving the CHO configuration acknowledgement message 250, a multiple sequential CHO configuration data 1100 is sent 140 from serving cell 310 to the UE 110.

In other words, the source gNB or the serving cell might, for example, before the CHO is configured to the UE(s) or before the CHO configuration data is received by the UE, request the CHO to the target gNBs or target cells to, for example, allow the target gNBs or target cells to, for example, do admission control, reserve resources and prepare for CHO. The target gNBs may confirm the CHO requests to the source or serving cell and may provide certain parameters back to the source or serving cell, that is, for example, provided to the UE(s) during the CHO configuration. These parameters may be provided to the UE(s) within the CHO configuration.

For instance, within the CHO configuration request 240, the source cell 310 or serving source cell 310 can also request a CHO not only for itself as a serving cell, such as requesting cell 1 for CHO from cell 1→cell 2, but also for other cells that may become serving cells and may trigger CHOs within its coverage, such as requesting cell 2 for CHO from cell 2→cell 3. For this, a list of cell changes may be provided to the target cell 120, for example, to allow the target gNB or the target cell to know, for example, from which source gNB or cell the CHO is expected.

For instance, in the configuration request message 240, the serving source cell 310 may provide the full list of the sequential CHO and/or may provide only the relevant CHO information to each of the target cells 120.

Since, for example, the mobility path or route is known the target cells 120 may also be provided an expected timing for the arrival of UEs and/or the predicted execution or completion of the CHOs. This information might support the target gNBs to, for example, do an accurate admission control, reserve resources and prepare for CHO and might limit the resource reservation to the time the UE is actually expected instead of, for example, a permanent resource reservation. The respective cell might track, for example, the load of all UEs within the cell and/or the UEs expected to arrive at its cell.

For instance, the inter-gNB signalling is exchanged in LTE connected to Evolved Packet Core via X2 and/or S1-MME interface and in LTE/NR connected to 5G Core via Xn and NG-C interfaces.

Figure 5:
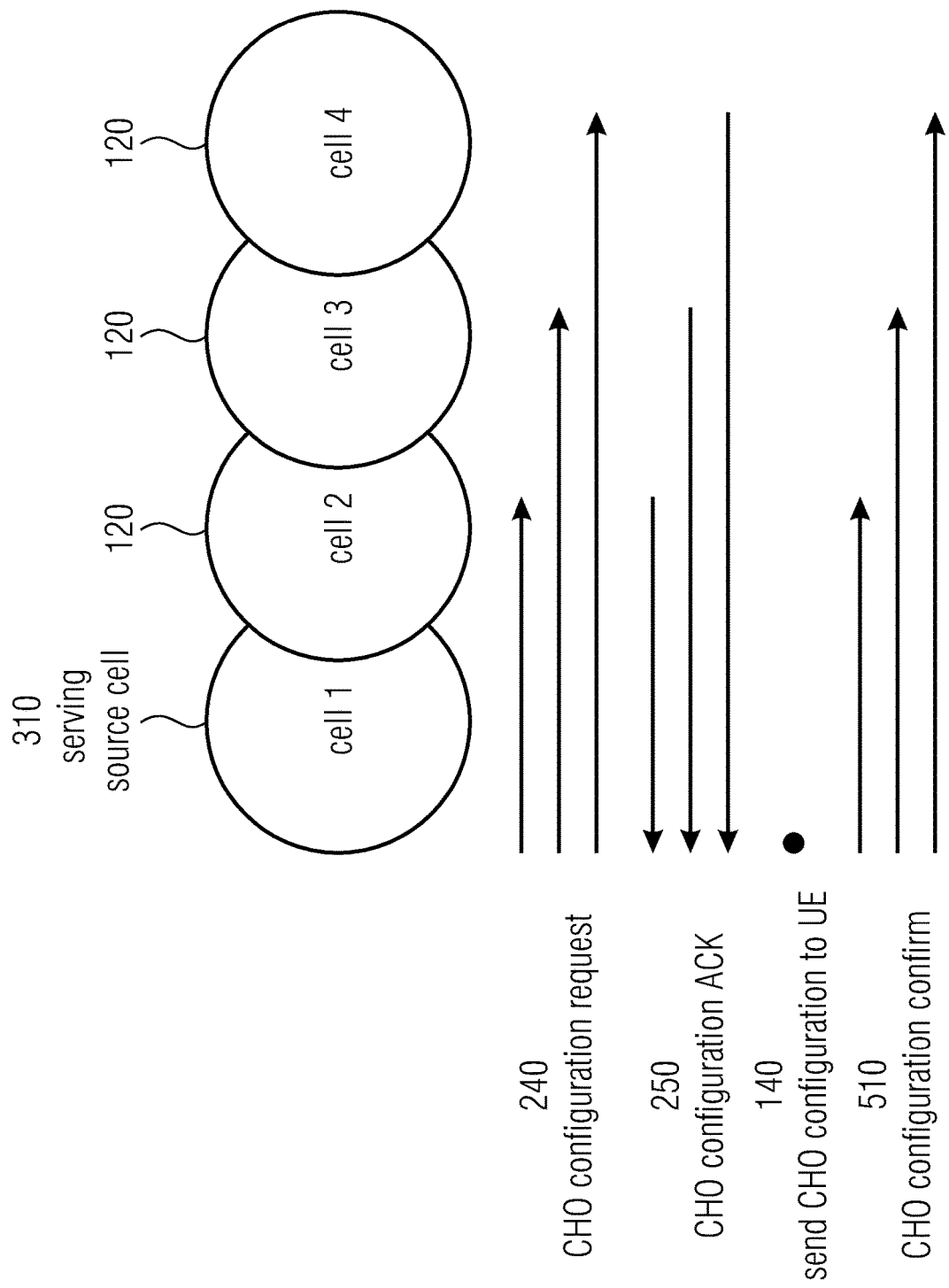
FIG. 5 shows a schematic diagram of an embodiment of a preparation for a CHO configuration in a sequential conditional handover.

Similar to FIG. 4, FIG. 5 shows a schematic diagram of an embodiment of a preparation for a CHO configuration in a sequential conditional handover, comprising the first four cells of FIG. 3, cell 1-4, along a mobility path of a moving UE 110, wherein cell 1 is a serving or a source cell 310 and further cells, cell 2-4, are potential target cells 120.

Similar to FIG. 4, a CHO configuration request 240 is sent from the serving cell 310 to the potential target cells 120, such as to cell 2-4. The possible target cells review the possibility of the CHO and/or prepare for the CHO. In case of a possible CHO, the serving cell 310 receives CHO configuration acknowledgement messages 250 from potential target cells 120.

As a next step, sequential CHO configuration data is sent 140 to the UE 110 by the serving cell 310. Parallel to sending sequential CHO configuration data to UE 110, the serving cell 310 confirms the decision requested in the CHO configuration request by sending a CHO confirm information 510. The CHO confirm information may contain further information about the CHO such as cell identities, time information about when a UE 110 is expected in the certain cell, and/or which service per slice is the UE 110 using.

In the embodiment shown in FIG. 5 the serving cell 310 confirms the requested CHO configuration to the potential target cells 120, such as cell 2-4, and may provide extra information about, for example, cell identities, time information when the UE is expected and/or the service/slice the UE 110 is using.

In other words, once, for example, the CHO configuration is decided, e.g. based on feedback from all the target candidates or target cells 120 the serving cell 310 may provide, for example, the CHO configuration or CHO configuration data to the UE. At the same time, also all the target gNBs or target cells might be provided the information about, for example, the sequence of CHO handovers.

This CHO configuration confirmation information 510, for example, confirm the decision that was requested in the CHO configuration request 240 and/or may provide the final outcome to the sequential CHO configuration send to the UE, e.g.
- the cell identities, that is physical cell identities and/or global cell identities, and/or
- the time and/or time window a UE is expected in a certain cell or target cell, and/or
- the service/slice the UE is using and/or expecting in the new cell.

Figure 6:
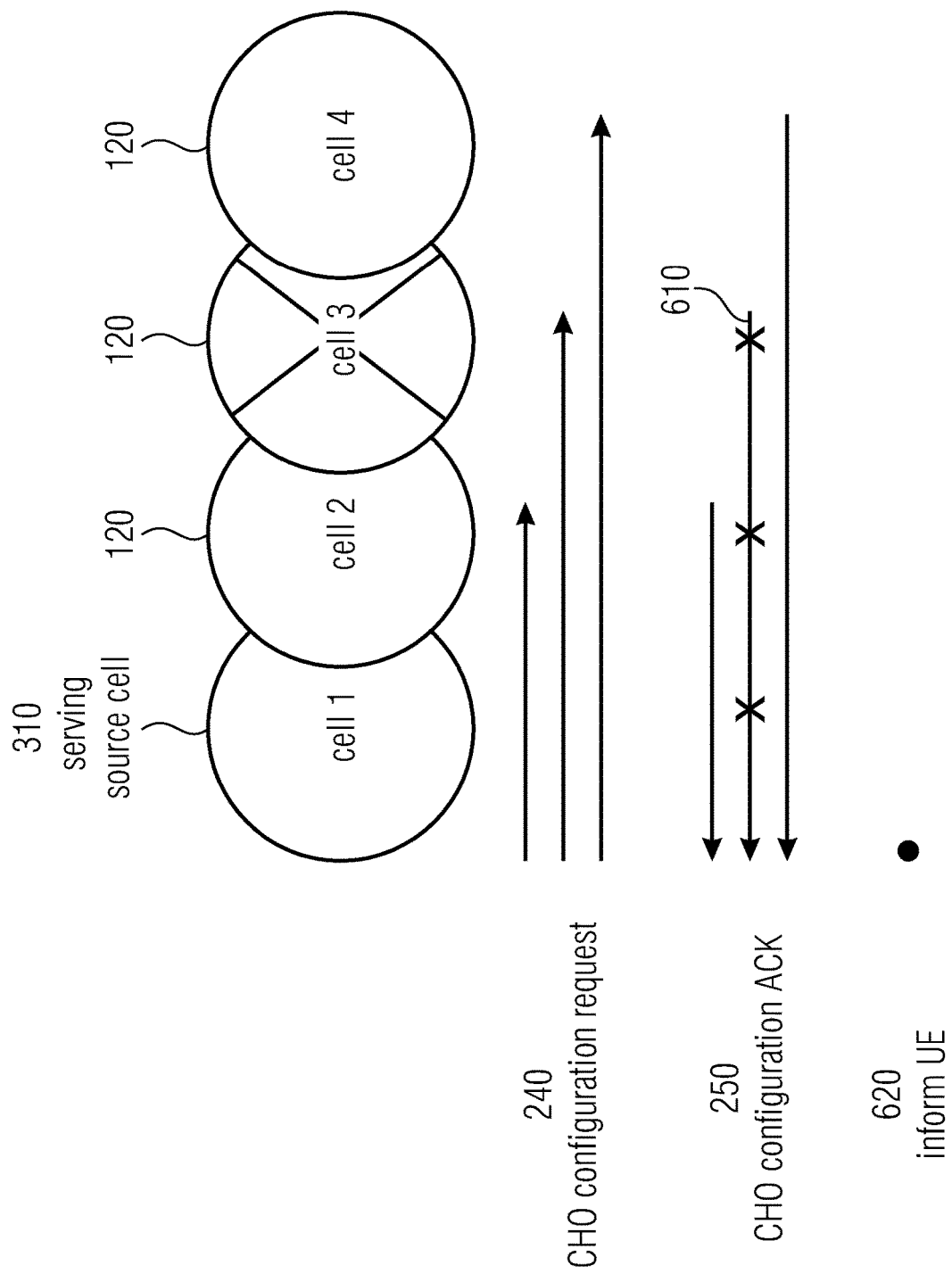
FIG. 6 shows a schematic diagram of an embodiment of a scenario, wherein a given handover in a sequential conditional handover is not possible.

A target base station or a target cell 120 may not be available and/or after reviewing the possibility of a CHO the potential target cell 120 can decide, that it will not be available for a CHO. FIG. 6 illustrates such a scenario.

FIG. 6 shows a schematic diagram of an embodiment of a scenario, wherein a given handover in a sequential conditional handover is not possible. Similar to FIG. 4, FIG. 6. shows the first four cells of FIG. 3, cell 1-4, along a mobility path of a moving UE 110, wherein cell 1 is a serving or a source cell 310 and further cells, cell 2-4, are potential target cells 120. In contrast to FIG. 4, from the possible three target cells, cell 2-4, cell 3 cannot reserve resources and/or it is temporarily unavailable and/or it may not be able to support the UE 110.

As discussed in FIG. 4, a CHO configuration request 240 is sent from the serving cell 310 to the potential target cells 120, such as to cell 2-4. The possible target cell reviews the possibility of the CHO and/or prepares for the CHO. In case of a possible CHO, the serving cell 310 receives CHO configuration acknowledgement messages 250 from potential target cells 120, such as from cell 2 and cell 4.

Unlike in the scenarios above, the serving cell does not receive a CHO configuration acknowledgement message 250 from cell 3. In case of, for example, cell 3 is temporarily not available, cell 3 does not send any message to the serving source cell 310. It is also possible, that a target cell 120, like cell 3, cannot reserve resources or is not able to support the UE or for other reasons, it cannot acknowledge the CHO configuration request 240. In this case, the target cell 120, like cell 3, sends a CHO configuration not acknowledged (NACK) message 610 to the serving source cell 310.

Receiving a CHO configuration not acknowledged message 610 the serving cell 310 may look for alternatives in the given cellular network, such as a different possible base station 120 or a different frequency layer.

If realizing and/or deciding that sequential CHO is not possible, the serving source cell 310 informs 620 the UE 110 that the reliable handover may not be guaranteed. A message may include further information, for example about the last cell where the sequential CHO is possible, a time information, such as until when a reliable handover is ensured, and/or limitation of the service and/or limitation of quality of service (QOS) parameters. The serving cell 310 may also inform the core network and/or the AMF in the core network or in the cellular network in order to resolve, for example, an overloaded base station situation, by, for example, releasing certain users of a given base station.

In other words, for instance, sequential CHO may not always be possible. A target gNB or a target cell 120 may decide that, for example, it cannot reserve resources, e.g. overload situation and/or a cell temporarily not available for some reason, or may not be able to support certain UEs, e.g. a slice may not be provided for this service. In this case, for example, the target gNB may not response with a CHO Config ACK message, but with, for example, a CHO Config NACK message. For instance, the target gNB or the target cell may not inform the source gNB or the source cell about its reasoning for not supporting the sequential CHO configuration or the requested CHO configuration.

For instance, based on the feedback the source gNB or serving source cell or serving cell may look for alternatives, e.g. may use a different cell or target cell for instance at a different frequency layer, and/or may eventually decide that a Sequential CHO is not possible. It may inform the UE, that a reliable handover may not be guaranteed. This signalling to the UE may contain information such as:
- the time reliable handover or communication in general can be provided or from which time reliability cannot be ensured, and/or
- the last cell sequential CHO is configured, and/or
- which service can still be supported, and which service cannot be supported anymore, e.g. by autonomous driving, and/or
- which QoS parameters might still be supported, and which QoS parameters may not be supported anymore, e.g. reliability, BLER rate, certain interruption time, latency.

The source gNB or serving cell may, for example, also inform the AMF in the 5G core network (5GC) or in the cellular network about this event and/or may provide similar information to the 5GC. The 5GC may forward such information to, for example, an application server and/or may trigger the release of certain users or services and/or, for example, may renegotiate the QoS settings with the radio network and/or the respective application server.

Figure 7:
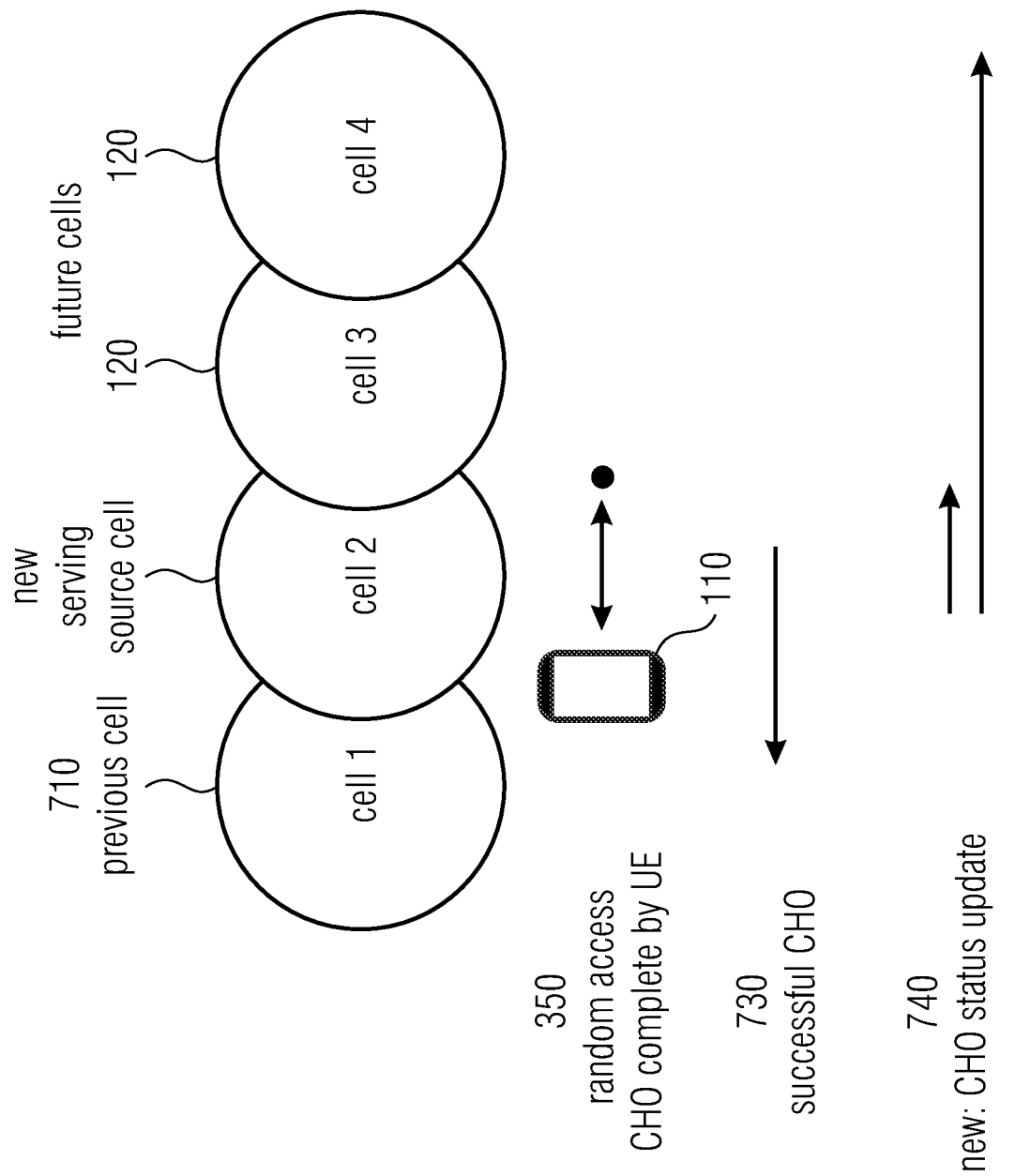
FIG. 7 shows a schematic diagram of an embodiment of a scenario after a successful random access CHO from cell 1 to cell 2.

FIG. 7 shows a schematic diagram of an embodiment of a scenario after a successful random access CHO from cell 1 to cell 2. Similar to FIG. 4, FIG. 7. shows the first four cells of FIG. 3, cell 1-4, along a mobility path of a moving UE 110. The scenario comprises cell 1 as the previous serving cell 710, cell 2 as the new serving source cell 720 and further potential target cells 120, cell 3-4.

The first step of the scenario comprises that the UE 110 completes 350 a random access CHO from cell 1 to cell 2. Cell 1 becomes the previous serving cell 710 and cell 2 becomes the new serving cell 720.

As a next step, the new serving cell 720 informs 730 the previous serving source cell 710 about the successful CHO, which makes the previous serving cell 710 releasing the UE 110 context.

The new serving source cell 720 also informs potential target cells 120 about a successful CHO by a CHO status update 740. The status update 740 may contain further information important for the resource reservation of the potential target cells 120 and/or for the expected time of arrival of the UE 110, which may result in a better prediction of the UE 110.

In other words, after successful, completed CHO execution by the UE and the target gNB (like in step 4 on FIG. 2), the target gNB or target cell 720 may inform the source gNB 710 about the successful CHO execution for a UE context release (like in step 5 on FIG. 2). It may also inform the core network, for example, to execute the path switch. According to an embodiment a new CHO status update message might also be sent, for example, to the future cells 120, to the CHO candidates or target cells 120.

For instance, by the message the future cells or potential target cells may update their resource reservation and/or the expected time of arrival of the UE.

This signalling to the future gNBs or target cells may, for example, contain information such as:

the time when the UE(s) arrived in the new service cells, and/or the time the UE(s) can be expected in the future cells, and/or the service and/or slice the UE is using now or is expecting in the future cells, and/or the speed the UE is moving, and/or the motion vector of the moving UE, and/or the exact GPS coordinates in 2D or 3D of the UE, and/or a motion vector of the UE, and/or the history of cell changes in the past, and/or statistics about the traffic activity, and/or an updated UE identity, e.g. C-RNTI and/or a mapping to the UE identity in the previous cells.

In case the UE context is, for example, exchanged between network nodes or cells, e.g. between gNBs and/or between gNB and the AMF, the UE's CHO configuration may be included in the UE context signalling.

Figure 8:
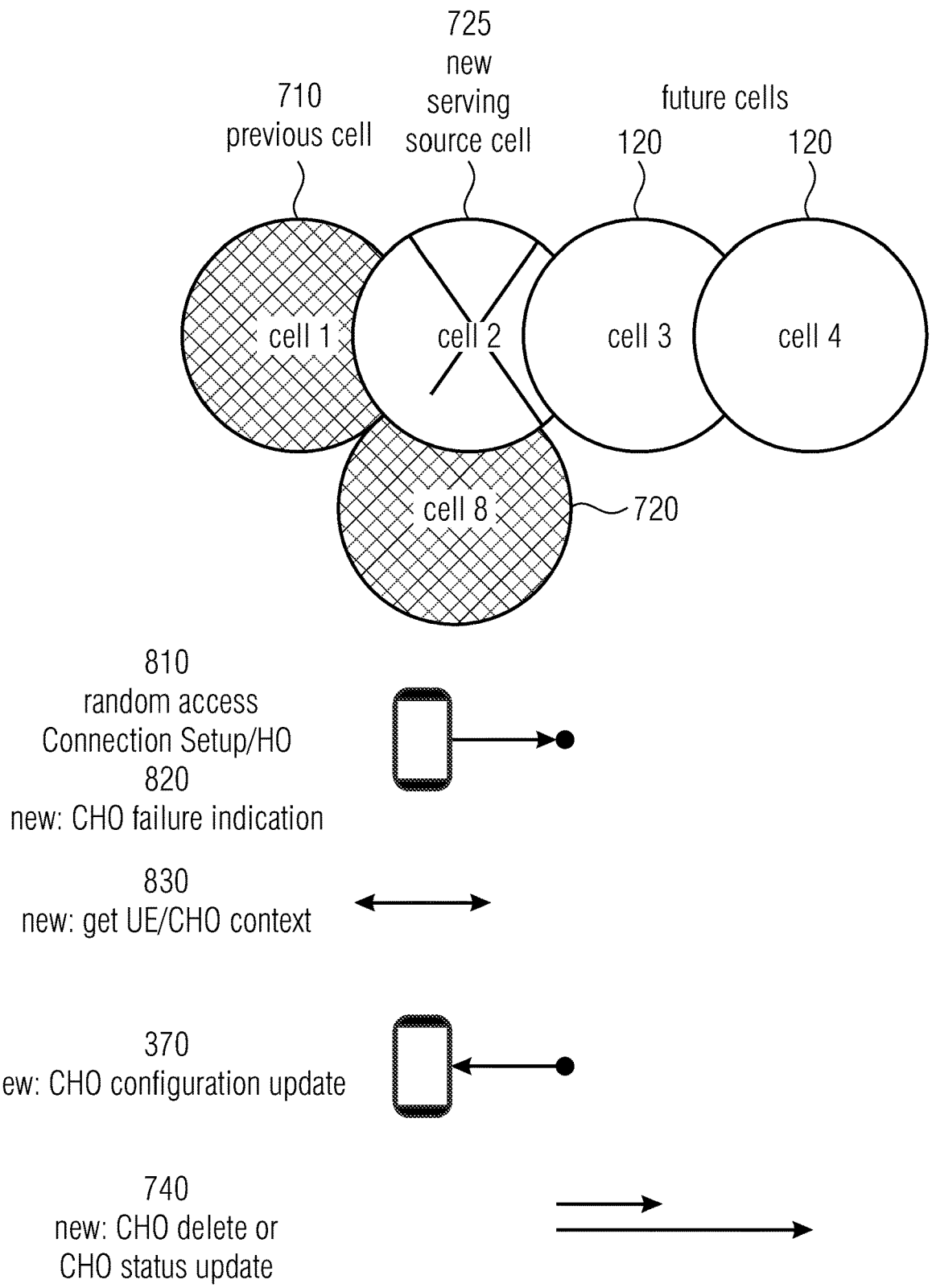
FIG. 8 shows a schematic diagram of an embodiment of a scenario with an incorrect prediction.

Embodiments rely on a predicted UE mobility path or on an expected future route. The predicted mobility path may be highly probable, but sometimes, as shown in FIG. 8, it remains just a prediction. FIG. 8 shows a schematic representation of a scenario with an incorrect prediction, wherein for some reason the prediction fails and the CHO handover is not executed as predicted or as expected.

The scenario of FIG. 8 comprises the first four cells of FIG. 3, cell 1-4, along the predicted mobility path or the expected future route of a moving UE 110 and a new cell, cell 8. According to the prediction, the UE 110 moves on the predicted mobility path and executes CHOs with cells, cell 1-4, along the predicted mobility path or the expected future route. In FIG. 8 a potential target cell, cell 2, cannot reserve resources and/or it is temporarily unavailable and/or may not be able to support a CHO with the UE 110. Cell 2 becomes a failed predicted serving cell 725.

As the predicted or expected CHO with cell 2 fails, the UE searches for and connects 810 to a new cell, to cell 8. That is, cell 1 becomes the previous serving cell 710 and cell 8 becomes the new serving cell 720. Cell 2 might be a advantageous target cell and cell 8 the backup target cell.

After a successful handover from the previous serving cell 710 to a new serving cell 720, the UE 110 sends a message with a CHO failure indication 820 to the new serving cell 720 and/or to the previous cell 710, if the UE 110 is still connected to the previous cell 710. The message of CHO failure indication 820 may contain further information, for example in form of a measurement report.

The new serving cell 720 may ask 830 the UE 110 for further UE and/or CHO context information. Based on the received context information, the new serving cell 720 may contact and/or forward information to the previous cell 710.

As the previous prediction or expectation failed, the CHO configuration data 1100 of the UE 110 is needed to be updated 320 by the new serving cell 720. The new serving cells 720 also informs the potential target cells 320, for example, in the form of a status update 740. Informing the potential target cells 120 may allow the potential target cells 120, cell 3-4, to free up resources reserved for the UE 110.

In other words, the invention relies on, for example, a predicted deterministic UE mobility or on an expected future route. In case, for example, such CHO handover is not executed as expected, e.g. a certain CHO within a certain time window, a UE behaviour might be needed to be defined to keep the radio link and/or to update the CHO configuration or the CHO configuration data.

For instance, the UE may be configured to perform a CHO at a specific or expected position and/or within a specified or expected time window to a specific target gNB or target cell. In case, for example, the UE passed the respective position and/or the respective time window and does not see the expected target cell or a different cell, e.g. cell 8, it may, for example, tell the source gNB, e.g. with a report or a measurement report and/or a CHO failure message, if it is still connected and/or may tell the new target gNB or new serving cell, e.g. after a RACH/Connection Setup procedure, that is already connected to, for example, that the CHO configuration was erroneous predicted or expected and/or that the CHO configuration or CHO configuration data might be needed to be updated.

The message or the report from the UE to the gNB or serving cell may include, for example, a CHO failure indication, and/or a UE positioning information (2D or 3D), and/or a time stamp information, and/or some signal strength measurements associated with UE position and time, and/or its CHO configuration and/or in which cells the context for the CHO configuration is stored, and/or information about the last cell the UE was connected to, e.g. Physical Cell Identity or Global Cell Identity, and its UE identity, e.g. C-RNTI, in the last cell, and/or information about the cell it was expected to do a CHO.

For instance, based on the UE failure indication a newly connected gNB or new serving cell may forward some information to the last connected cell or to the previous serving cell. It may also ask, for example, the UE and/or CHO context information. Once it received to UE and/or CHO context, the new cell or the new serving cell may update to CHO configuration or CHO configuration data towards the UE.

For instance, the new cell may also inform the previously expected cells or the potential target cells to delete to CHO configuration and/or reservation for this UE and/or to update the CHO status respectively.

Alternatively, the UE may, for example, only send a failure indication or a report to the gNB or the new serving cell and offer the gNB to provide a more detailed report if requested. Once the gNB or the new serving cell requests the full report and/or measurement data, the UE might send it to the gNB or to the new serving cell.

Instead of the UE providing a failure message the source gNB or the previous serving cell may also see that the UE does not execute a CHO as expected and, for example, may ask the UE to provide some measurements or measurement data.

Figure 9:
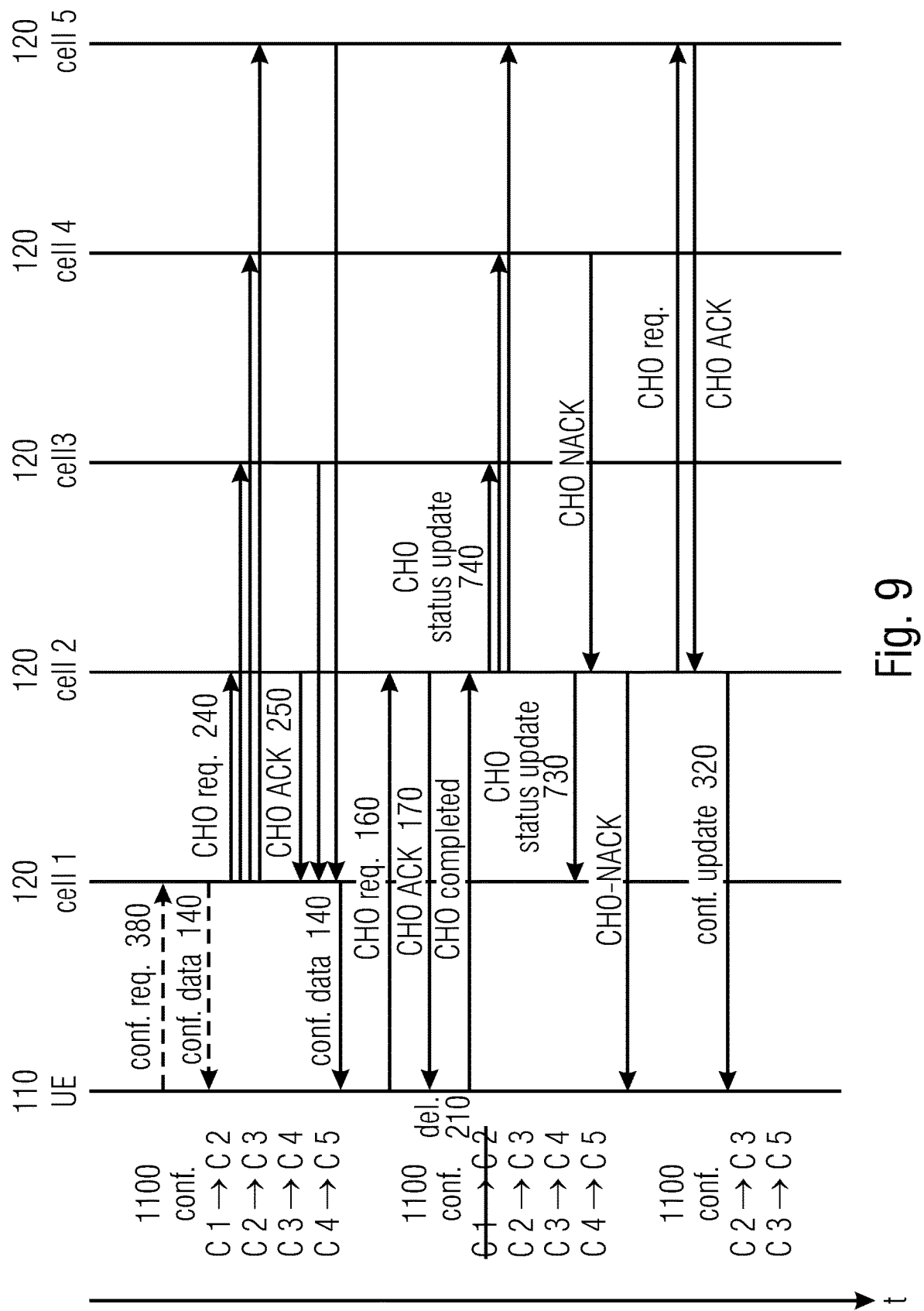
FIG. 9 shows a schematic representation of an embodiment of a communication between a UE and several cells of a cellular network.

FIG. 9 shows a schematic representation of an embodiment of a communication between a UE 110 and several cells, cell 1-5, of a cellular network.

As the first step on FIG. 9, the UE 110 sends a configuration request 380 to the serving cell, in particular to cell 1. The UE 110 receives 140 the configuration data 1100 from cell 1. The received configuration data 1100 is a sequential configuration data comprising multiple trigger conditions and CHO configuration data, in particular for conditional handovers from cell 1 to cell 2, from cell 2 to cell 3, from cell 3 to cell 4, from cell 4 to cell 5.

Alternatively, before sending 140 the configuration data 1100 to the UE 110, cell 1 sends CHO configuration requests to the potential target cells cell 2-5, and receives CHO configuration acknowledgment messages 250 from the cells 2-5. After receiving the CHO acknowledgment messages 250, the configuration data 1100 is sent 140 to the UE 110.

As the trigger conditions are met, the UE 110 sends 160 a CHO request to cell 2. Cell 2 acknowledges the request with a CHO acknowledgment message 170 sent to the UE 110. The UE 110 completes or triggers the conditional handover and notifies cell 2 about the completion of the conditional handover.

After completing the conditional handover, the UE 110 modifies the sequential CHO configuration data, for example by deleting 210 the already completed conditional handover from cell 1 to cell 2 and preserving or keeping the second part of the conditional data.

In the meantime, cell 2 is sending out 730 a status update to the previous serving cell, cell 1, and send out 740 CHO status updates to the potential target cells cell 3-5.

It is also possible that one of the potential target cells 120 is not available as a conditional handover partner, such as cell 4 in FIG. 9. Cell 4 is not acknowledging the conditional handover by sending a CHO not acknowledged (NACK) message to the current serving cell, cell 2. The current serving cell, cell 2, forwards the CHO not acknowledged message to the UE 110.

Further, cell 2 is searching for an alternative cell, alternative to cell 4. As cell 5 seems to be a good alternative, cell 2 sends a CHO request to cell 5. The alternative serving cell, cell 5, acknowledges the CHO request by sending a CHO acknowledgment (ACK) message to the current serving cell, cell 2. The current serving cell, cell 2, sends a configuration update 320 to the UE 110 in order to modify the configuration data 1100 of the UE 110. The new configuration data 1100 comprises trigger conditions and configuration data for the handovers from cell 2 to cell 3 and from cell 3 to cell 5.

In order to gain a better overview of some of the scenarios explained above, FIG. 9 comprises, for example, the UE 110 requesting and receiving a multiple sequential configuration data; a completed CHO process including the serving cell sending CHO request to the potential target cells, receiving CHO acknowledgement and/or configuration data from the potential target cell, forwarding the CHO configuration data to the UE, executing or triggering a CHO, and the new serving cell informing the former serving cell and potential target cells about the completed CHO. Further example may comprise a potential target cell not acknowledging the CHO, the new serving cell informing the UE about the NACK message, searching and finding an alternative target cell and informing the UE with a configuration update data.

Figure 10:
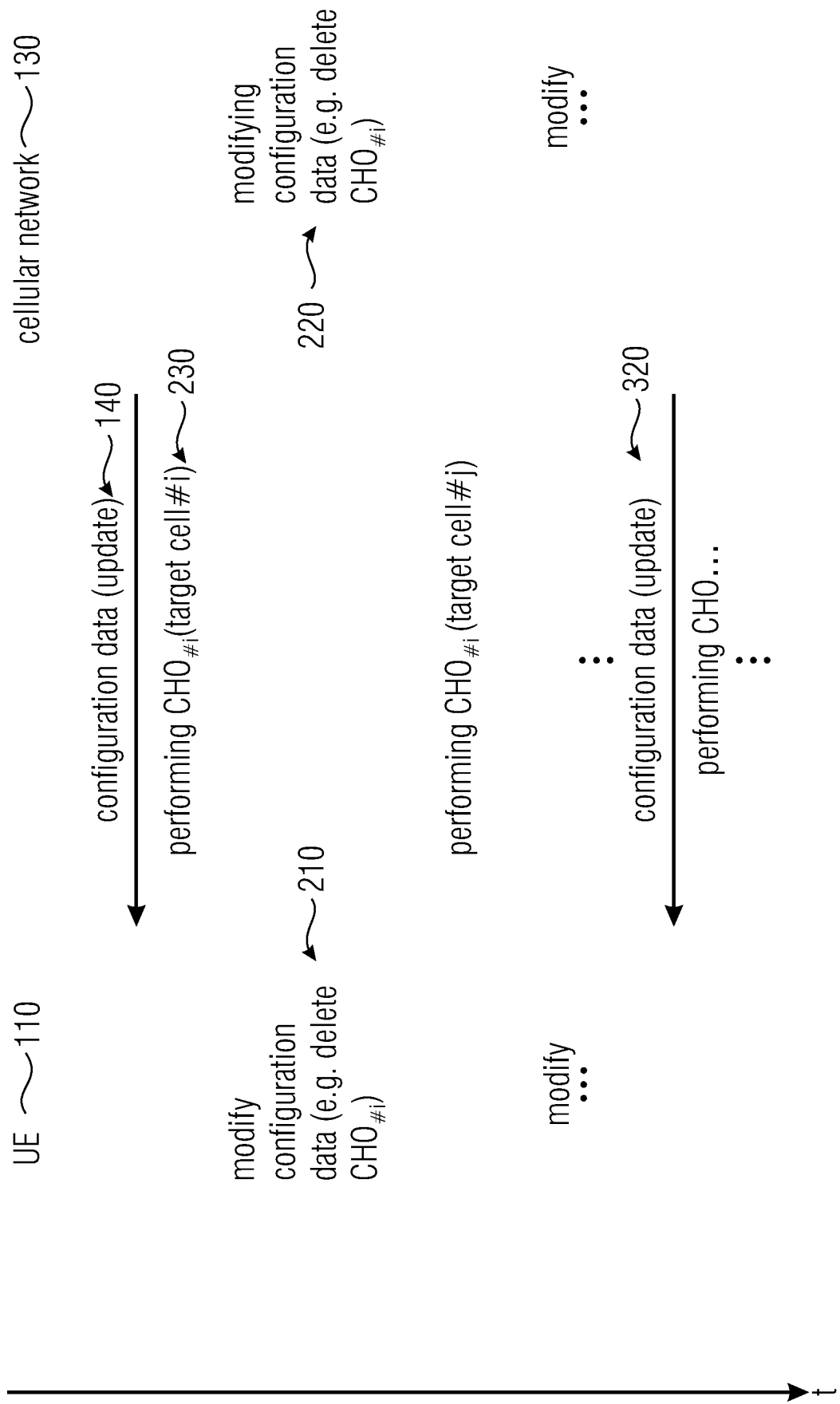
FIG. 10 shows a schematic representation of an embodiment of a general communication between a UE and a cellular network.

FIG. 10 shows a schematic diagram of an embodiment of a general communication between a UE 110 and the cellular network 130 comprising a UE 110 and a cellular network 130.

The UE 110 receives configuration data or configuration updates from the cellular network 140. The configuration data comprises multiple trigger conditions and handover configuration data. As one or more of the trigger conditions are met, the UE 110 is performing an i-th CHO with the i-th target cell. After completing a CHO, the UE 110 may modify 210 its configuration data, which may include deleting the data related to the already performed i-th CHO. The cellular network 130 may act synchronously, that is modifying 220 its configuration data, which may include deleting the data related to already performed i-th CHO.

As trigger conditions are met, the UE 110 is triggered to perform a next, j-th CHO with the target cell number j. After performing a CHO, a modification of the configuration data may occur on the UEs and/or on the cellular networks side.

As further trigger conditions are met, performing CHO-s are triggered, optionally followed by modification of the configuration data.

At some point in this loop, the UE 110 needs a new configuration data. The UE 110 requests and/or receives a configuration data update 320, allowing further performance of conditional handovers, if the trigger conditions are met or in case of an appliance of the trigger conditions.

In some cases, when more than one UEs are moving on the same mobility path or on the same expected future route the signaling overhead can be further reduced. For the described scenarios the mobility path of a set of UEs and/or the gNB may well be known. Instead of configuring all the UEs individually, for example, the CHO configuration or the CHO configuration data, or part of it, such as a first portion of the CHO configuration data, may be provided by RRC broadcast signalling via a System Information Block (SIB) or a multicast signalling. The SIB may be dedicated for mobility or not. For instance, every UE that is active has to read the SIB and therefore also reads and knows the CHO configuration, or the broadcasted first portion of the CHO configuration data.

Figure 11:
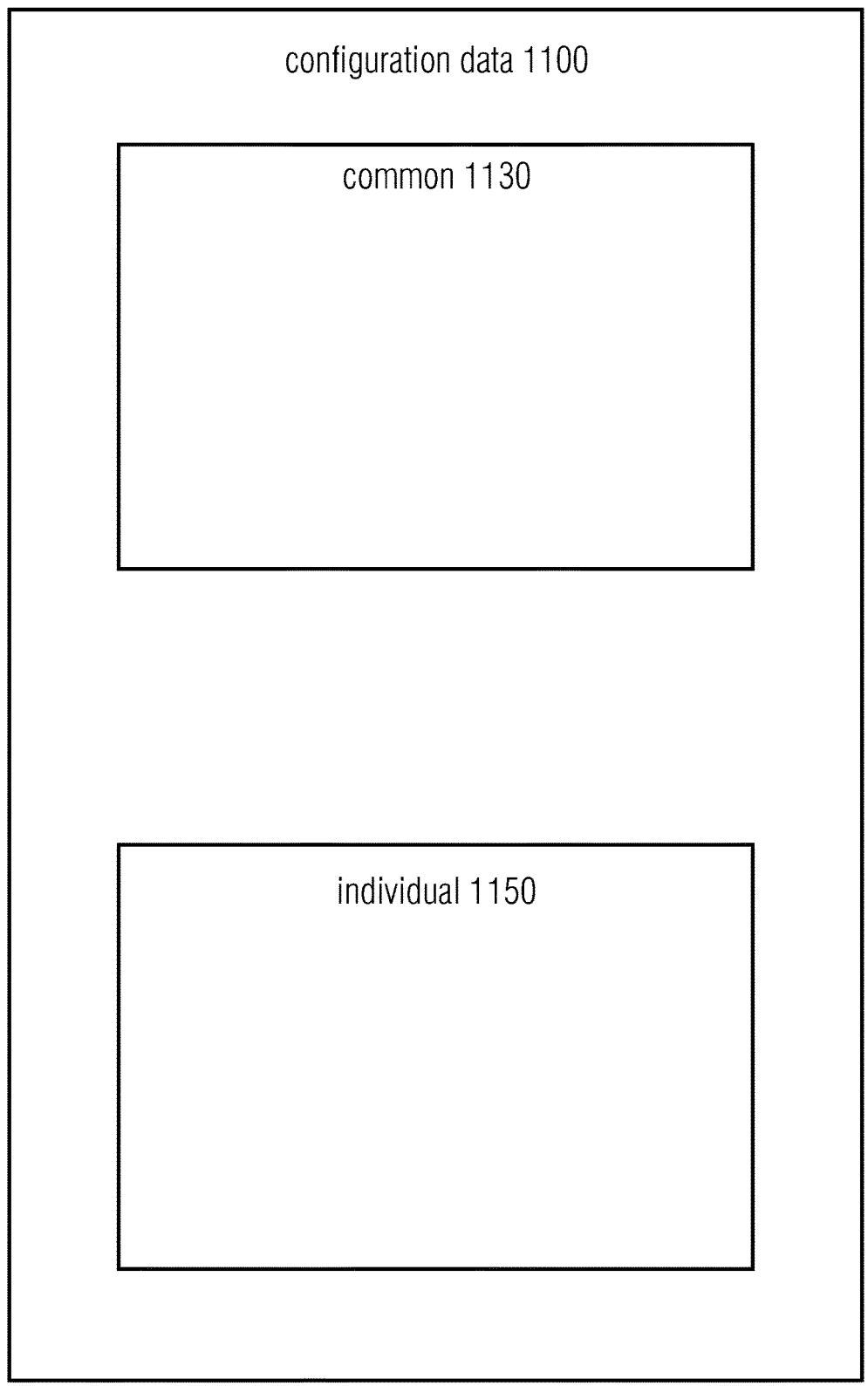
FIG. 11 shows a configuration data of a set of UEs with known mobility path.

FIG. 11 shows a configuration data 1100 of a set of UEs with known mobility path. The configuration data 1100 comprises a first portion 1130 with a set of common parameters 1130 and a second portion with a set of individual parameters 1150.

The common parameters 1130 of the configuration data 1100 comprises group specific common parameters and are configured to be transmitted via broadcast, groupcast or multicast transmission.

The individual parameters 1150 of the configuration data 1100 comprises user specific parameters, such as identification information, and are configured to be transmitted via unicast transmission.

Some of the configuration data may be pretty static, e.g. based on the cell deployment and/or street layout or LEO satellite routes, while, for example, other configuration parameters may be more dynamic, e.g. based on the response of the target gNB or target cell on a CHO request (like in Step 1 of FIG. 2). In one embodiment of the inventive apparatus the common and/or static parameters are signalled, for example, via RRC broadcast signalling while the dynamic and/or individual parameters, like the second portion of the CHO configuration data are signalled, for example, via UE dedicated RRC signalling.

In case of the moving LEO satellite, for example, a HO for all the UEs is expected at predefined times. Also, the next LEO satellite can be known and fixed. Therefore, all the information for handover may be provided to, for example, all the UEs jointly instead of dedicated signalling.

The broadcast information may, for example, broadcast the configuration of multiple mobility paths or routes e.g. per direction of a street. It may be up to the UE to detect the path it is traveling upon and/or the network may signal to the UE which path the UE might apply in its configuration.

The configuration may or may not be active at the initial state. For example, a first and/or a second portion of the configuration data may comprise a separate activation information. This behaviour may be hard coded in the specification, the one or the other, or may be configurable by signalling. In the latter case, there might be a bit in the RRC message informing the UEs if, for example, CHO is already activated after configuration and/or, for example, if it still needs to be activated after configuration.

By this technique, a CHO within a cell may be limited to some UEs and/or a group of UEs, e.g. traveling in a train or driving on the street. In case it is not active the network can activate the already configured CHO execution trigger, for example, via the Radio Resource control (RRC) reconfiguration message after getting connected to that gNB or cell or, for example, via a Medium Access Control (MAC) Control Element that may be included in the header of a data packet.

Further Embodiments

An embodiment of a user equipment 110 supporting conditional handovers to one or more cells 120 of a cellular network 130.

The user equipment 110 is configured to receive configuration data 1100 from the cellular network 120. The configuration data 1100 indicates for a plurality of target cells 120 of the cellular network 130, conditions to trigger 160 a conditional handover to any of the target cells 120.

The user equipment 110 is further configured to check 150 the conditions with respect to appliance, and, in case of appliance, trigger 160 the conditional handover. That is, in other words, the configuration data 1100 relates to a plurality of target cells 120 of the cellular network 130 which are, for instance, arranged alongside an estimated future route of the UE 110, and for each of this plurality of target cells 120, the configuration data 1100 may be indicative of one or more associated conditions the appliance of which shall continuously by determined by the UE 110 and, if any of them (or a combination of them such as all) is met, this circumstance shall trigger the UE 110 to commence the CHO to the respective target cell. Thus, the configuration data 1100 might be structured into parts, each relating to a certain target cell and comprising the one or more conditions associated with the respective target cell.

In an embodiment the user equipment is configured to delete 210 a first part of the configuration data 1100 and keep a second part of the configuration data 1100 after a conditional handover is completed 230, 350 or, alternatively speaking, responsive to having completed a handover to a certain one of the target cells, such as deleting the first part which relates to the conditional handover having been completed 230, 350 (or to the corresponding target cell, respectively). Thereby, there is no need for the network to update the configuration data of the UE after any CHO conducted having been conducted, and the UE, in turn, is freed from checking conditions relating to target cells to which a CHO has already been done. Further, it might be unwanted that UEs may switch back, by a CHO, to target cells of the plurality of target cells, to which a CHO took place once.

The cellular network 130 may act synchronously 220, that is, it may modify the configuration data synchronously 220, so that the configuration data is kept equal at both sides, the UE and the network 130. To be more precise, the network might keep only those target cells prepared for a CHO, such as by allocating corresponding CHO details for the UE 110, to which the updated/synchronized configuration data yet relates.

In an embodiment the first part of the configuration data 1100 relates to the completed and/or finished handover while the second the part of the configuration data relates to not yet completed or finished handovers.

According to embodiments the user equipment 110 is, thus, configured to keep on the checking 150 beyond a first triggering of the conditional handover. That is, in other words, the configuration data 1100 relates to a plurality of target cells 120 of the cellular network 130 which are thought of forming useful target cells to perform CHOs to even sequentially, on by the other, rather than purely alternatively to each other, so that the UE keeps on checking the conditions of the configuration data beyond a first CHO having been triggered based on these conditions.

In an embodiment the user equipment is configured to trigger 160 the conditional handover by sending a signal 160 to the target cell and complete 230, 350 the conditional handover by receiving a signal from the target cell.

According to embodiments, the first triggering 160 relates to a conditional handover from a first cell 120 to a second cell 120 and the keeping on the checking includes checking 150 conditions with respect to a conditional handover from the second cell 120 to the first cell 120, i.e. back to the first cell which is then also one of the target cells which the configuration data refers to, and/or any other cell out of the target cells. Note that the conditions, for example, from the first cell 120 to the second cell 120 may differ from the conditions from the second cell 120 to the first cell 120. In this manner, a switching back may be rendered possible, such as for the case the UE makes a U-turn and traverses an estimated future route reversely.

Additionally to checking, for example the trigger conditions related to the conditional handovers the UE can further check for non-configured target cells, i.e. can check for usefulness of handovers to any target cell not belonging to the plurality of target cells which the configuration data 1100 refers to, and in case a non-configured target cell is a suitable candidate, for example detected by triggering a measurement report or a different kind of configured/pre-configured trigger, inform the source cell about the suitable handover candidate, for example with a measurement report or a report which asks to reconfigure the conditional handover configuration. In this manner, a handover to the suitable cell can be initiated. In case of asking for an addition of a conditional handover to the target cells the configuration data relates to, the network, or the currently serving cell, may send a new configuration data or update to the existing configuration to the UE. It is also possible that a normal handover is initiated where the serving cell prepares the handover to the non-yet anticipated target cell.

According to embodiments, the user equipment 110 is configured to trigger 160 the conditional handover, which is available to the user equipment 110, only for a limited temporal interval indicated in the configuration data. In other words, a conditional handover to a certain one of the target cells may be conditioned by the configuration data, at least partially, in terms of a temporal interval, within which the conditional handover is allowed exclusively. Thus, the UE 110 would have to check whether the current time falls into that temporal interval to check whether a CHO to the corresponding target cell is available or not. For more than one, or all of the target cells which the configuration data relates to, such a temporal interval may be given in the configuration data.

According to embodiments, the limited temporal interval can be periodic or limited to a single time or once.

According to embodiments, the configuration data 1100 includes a start time and an expiration time of the limited temporal interval. The limited temporal interval may be defined by an interval and/or by a start time and an expiration time.

According to embodiments, the configuration data 1100 includes more than one limited and/or periodic temporal interval assigned to different target cells 120. A periodic temporal interval, such as a cyclic sequence of temporal intervals, can be defined, for example, when using satellites target cells, wherein the periodicity of the temporal interval is related to the orbital periodicity of the satellite target cell.

According to embodiments, the conditions to trigger, or trigger conditions, might comprise a service-dependent trigger, e.g. URLLC deleting, ignoring or deprioritizing common configurations or cells that do not support URLLC traffic.

A trigger might further be a policy-dependent trigger, for example, based on a charging model, wherein specific UEs might not be allowed to access a certain technology, e.g. cheaper modems cannot access multi-RAT eNBs/gNBs. That is, for example, according to a policy, UEs of higher paying customers may access certain technology.

A trigger might further be a handover-failure trigger, wherein a UE can track the history of past unsuccessful handovers and can de-prioritize handovers to target cells which failed in the past and/or which are overloaded and/or which declined handovers in the past. This can also be a signalled trigger by the cellular network 120, e.g. the base station and/or the cell sends a trigger and adds a probability of success based on past analysis. This can be also comprised in the configuration data signalled by the cellular network, e.g. the base station and/or the cell sends a configuration data wherein a probability of success based on past analysis is attached to the trigger condition.

In an embodiment, the configuration data 1100 includes a advantageous target cell configuration data and/or a backup target cell configuration data or is indicative of a preference with respect to conditional handovers to the target cells.

In an embodiment, the configuration data 1100 includes a preference ranked and/or ordered target cell configuration data.

In an embodiment, the configuration data on the advantageous target cell and/or on a target cell 120 with a first, primary, preference includes different trigger conditions than the configuration data on the backup target cell and/or on a target cell with a second, subsidiary, preference.

Furthermore, the trigger conditions of the backup target cell configuration data and/or the configuration data of the target cell 120 with a second preference include an initial trigger condition according to which the handover with the advantageous target cell and/or a target cell with a first preference has failed, i.e. the one or more conditions for a CHO to that advantageous target cell had applied, but the handover finally failed.

This grouping or ranking can for example be done so as to.
Prefer cells that ensure service continuity and/or
give preference to cells with more bandwidth and/or
prefer 5G/LTE over 3G, GSM or another RAT and/or
prefer less occupied cells or cells with less strain on its communication resources and/or
prefer small cells or mm-wave operated cells over wider coverage macro cells that might operate at lower frequencies and/or
prefer unlicensed cells over licensed cells.

These preferences can also be the opposite depending for example on policy, charging model, modem type or running services.

In an embodiment, the configuration data 1100 includes information on an order of the target cells 120, in which the user equipment 110 is intended to perform 230, 350 the conditional handovers. For instance, the UE could be ought to check the condition whether a CHO to a certain target cell would result in this target cell being the nth target cell among the plurality of target cells the configuration data relates to, for which a CHO is initiated. If not, this target cell is not available for a CHO.

In an embodiment, the user equipment 110 is configured to update 320 the configuration data according to configuration updates 325 received from the cellular network 120.

That is, new configuration data would not be transmitted to the UE in a self-contained manner, i.e. completely anew, but differentially to a current version of the configuration data at the UE. In an embodiment, or alternatively speaking, the configuration updates or the update messages 325 may comprise a new version of the configuration data 1100 and/or only a changed portion of the configuration data 1100.

In an embodiment the configuration updates or the update messages 325 change the plurality of target cells 120 from a first set of cells to a second set of cells in a manner so that an intersection of the first and second sets comprise a plurality target cells.

In an embodiment the user equipment is configured to receive a first portion 1130 of the configuration data 1100 via broadcast or groupcast or multicast transmission, and a second portion 1150 of the configuration data via unicast transmission.

In an embodiment the first portion 1130 of the configuration data comprises group specific or common parameters, and the second portion 1150 of the configuration data comprises user specific or individual parameters.

In an embodiment the first portion of the configuration data is overwritten by the second portion of the configuration data, this means, that the common parameters can be overwritten by the individual parameters.

In an embodiment the second portion 1150 of the configuration data 1100 relates to handover details for the UE. It may comprise identification information relating to an identification of the user equipment and/or a RACH preamble identity and/or a physical resource reservation in the target cells. The identification information may comprise, for example, User ID, RNTI, RACH preamble, etc.

According to embodiments, the user equipment is configured to check whether the second portion 1150 of the configuration data 1100 comprises identification information relating to an identification of the user equipment and/or a RACH preamble identity and/or a physical resource reservation in the target cells, and if not, use a current identification information of the user equipment for the identification and/or a default pool of RACH resources and/or a random or default RACH preamble identity and/or a default physical resource reservation. The identification information may comprise, for example, User ID, RNTI, RACH preamble, etc.

According to embodiments, the second portion 1150 of the configuration data comprises a separate activation information indicating to the user equipment 110 that the configuration data 1100 is active for the user equipment 110. An activation information and/or an activation signal is indicating an activation and/or deactivation of a configuration, e.g. over Physical Downlink Control Channel (PDCCH).

According to embodiments, the first and/or second portion 1130, 1150 of the configuration data 1100 comprises target cell configuration information indicating to the user equipment 110 a following target cell configuration to be applied after the handover to the target cell 120.

According to embodiments, the user equipment 110 is configured to check whether the first and/or second portion 1130, 1150 of the configuration data 1100 comprises target cell configuration information indicating to the user equipment 110 a following target cell configuration to be applied after the handover to the target cell, and if not, take over the source cell configuration or a configuration information of a serving source cell 310 in case of the triggering of the handover.

According to embodiments, the first portion 1130 of the configuration data 1100 may comprise:

Physical cell identities relating to the candidate target cells and/or

Target cell configuration parameters, e.g. frequency or carrier bandwidth, and/or RACH preambles and/or RACH occasions to use for initial connect and/or Back-off procedure when initial connect fails and/or Trigger thresholds, quantities and events indicating the conditions of the conditional handover to be executed and/or Reference signals to measure specifies the signals to measure and/or Beam information and/or Averaging information and/or Physical location of the target cell.

The user equipment 110 can derive, for example, its timing advance and/or power control values from the distance to the target cell 120.

According to embodiments, the user equipment 110 is configured to check whether the first portion 1130 of the configuration data 1100 comprises Physical cell identities relating to the candidate target cells and/or Target cell configuration parameters, e.g. frequency or carrier bandwidth, and/or RACH preambles and/or RACH occasions to use for initial connect and/or Back-off procedure when initial connect fails and/or Trigger thresholds, quantities and events indicating the conditions of the conditional handover to be executed and/or Reference signals to measure specifies the signals to measure and/or Beam information and/or Averaging information and/or Physical location of the target cell.

If not, take over the respective information of the current and/or default first portion 1130 of the configuration data in case of the triggering of the handover. That is, if the first portion 1130 of the newly updated configuration data 1100 does not comprise any information about an element of the list above, the UE will use an available, previously updated information, or a default information instead.

According to embodiments, the user equipment 110 is configured to receive configuration data 1100 wherein the configuration data comprises Physical cell identities and/or RACH preambles and/or RACH occasions to use for initial connect and/or Back-off procedure when initial connect fails and/or User ID (e.g. RNTI) and/or Trigger thresholds and/or Reference signals to measure on and/or Beam information and/or Averaging information and/or Target cell configuration and/or Resource pool configurations or usage/utilization for V2X and/or Physical location of the target cell.

According to embodiments, the user equipment 110 is configured to receive configuration data 1100 including or excluding information on expected time of conditional handover discontinuity and/or the predetermined target cell and/or an announcement that a certain service and/or QoS flow and/or Logical Channel and/or Radio Bearer is not supported in the target cell and/or a network slice is not supported.

If a predetermined target cell 120, adjoining one or more first target cells 120 which adjoin each other and one or more second target cells 120 which adjoin each other, but do not adjoin the first target cells, indicates to the network that a continuity of the preparation of the conditional handover is unreliable.

According to embodiments, the user equipment is configured to trigger an update 380 of the configuration data from the serving cell 310 by sending a report, e.g. a measurement report, to the actual serving cell 310 and/or to a new serving cell.

Sending a report to the serving cell 310 may inform the serving cell when the user equipment 110 cannot perform a handover to one or more target cells 120, if the user equipment is still connected to a serving cell 310.

Sending a report to a new serving cell 310 may inform a new serving cell 310 about an erroneous handover configuration after the user equipment lost and re-connected to the cellular network.

According to embodiments, the report comprises a handover failure indication and/or a positioning information of the user equipment and/or a route information and/or time stamp information and/or signal strength measurement data associated to physical cell identities and/or handover configuration and/or handover context configuration and/or information about target cells in which handover context configuration are stored and/or information about the last cell to which the user equipment was connected to and identity of the user equipment in this last cell and/or information about the target cell the user equipment was expected to perform a handover.

A route information can be, for example, on the future route and/or a part of the future route of the user equipment 110 or a list of possible routes. Route information can be, for example, waypoints as a list of GPS coordinates or a motion vector, e.g. possibly containing speed and direction of the user equipment 110.

According to embodiments, the user equipment 110 is configured to inform the serving cell 310 in case of an erroneous handover configuration only by a failure indication and provide a detailed report only on the request of the serving cell 310.

According to embodiments, the user equipment 110 may be configured to provide measurement data triggered by a serving cell 310.

According to embodiments, the user equipment 110 is configured to provide measurement report and/or measurement data triggered by a serving cell 310, giving information about which triggers caused one or more previous handovers.

According to embodiments, the configuration data 1100 has an expiration time after which another configuration and/or a pre-configuration or a default configuration is used.

A contention free RACH preamble is only reserved for a certain time. Afterwards a different preamble is used and/or the default contention based RACH procedure is used.

According to embodiments, the user equipment 110 is configured to exchange context information with other nodes of a cellular network.

Other nodes of a cellular network may be described as any of the following embodiments.

The embodiments described herein may relate to transceivers and may in particular be explained in connection with the user equipment (UE). Embodiments are not limited to the UE but relate, without limitation to other types of transmitters or transceivers, e.g., a transceiver comprising at least one of:
- a user equipment;
- a mobile or immobile base station,
- a mobile terminal,
- a stationary terminal,
- a cellular IoT-UE,
- a vehicular UE,
- a group leader UE (GL),
- an IoT or narrowband IoT, NB-IoT, device,
- a ground based vehicle,
- an aerial vehicle,
- a drone,
- a moving base station,
- a road side unit (RSU),
- a building, and
- any other item and/or device provided with network connectivity enabling the item and/or device to communicate using the wireless communication network, e.g., a sensor or actuator.

For example, a mobile or immobile base station, may comprise one or more of
- a macro cell base station,
- a small cell base station,
- a central unit of a base station,
- a distributed unit of a base station,
- a road side unit,
- a UE,
- a group leader (GL),
- a relay,
- a remote radio head,
- an AMF,
- an SMF,
- a core network entity,
- a mobile edge computing entity,
- a network slice as in the NR or 5G core context, and
- any transmission/reception point, TRP, enabling an item or a device to communicate using the wireless communication network, the item or device being provided with network connectivity to communicate using the wireless communication network.

A further embodiment of a cellular network 130 supports conditional handovers, and is configured to preemptively prepare, for one or more predetermined user equipments 110, for each of one or more target cells 120 of the cellular network 130 of the one or more predetermined user equipments 110, for a conditional handover of the user equipments 110 to one or more respective target cells 120 identified by cell identities.

The cellular network 130 is further configured to send configuration data to the user equipment 110 which describes for each cell the conditions to trigger the handover to the respective cell.

The cellular network 130 is preemptively preparing for a handover of the inventive user equipments 110 to the respective cell—or simply preparing a future handover possibly performed by the user equipment to the respective cell. The preemptive preparation may involve attributing one of an available IDs to the user equipment. The ID being included, for instance, in a user equipment individual portion 1150 of the configuration data 1100.

The preemptive preparation can for example include
- Transferring and storing the User context, e.g. RRC context and/or
- Reserving a user ID, e.g. RNTI and/or
- Reserving a RACH preamble and/or
- Reserving resources and/or
- Routing and/or duplicating packets to one or more prepared target cells and/or
- Preparing edge cloud functions and/or
- Checking and or preparing QoS for services running.

According to embodiments, the cellular network is configured to inform the serving cell from the target cells about an expiration time for the conditional handover.

According to embodiments, the cellular network is configured to include into the configuration data information on triggering conditions upon which the user equipment shall perform the conditional handover to the one or more cells.

According to embodiments, the cellular network configured to include into the configuration data a common configuration data which might be overwritten by the trigger conditions.

According to embodiments, the advantageous target cell configuration data and/or the configuration data on a target cell with a first preference includes different trigger conditions than the backup target cell configuration data and/or the configuration data on a target cell with a second preference. The trigger conditions of the backup target cell configuration data and/or the configuration data of the target cell with the second preference include an initial trigger condition that the handover with the advantageous target cell and/or the target cell with the first preference is failed.

According to embodiments, the cellular network is configured to inform the next target cell about the successful handover of the UE to the previous target cell, from a target cell to which a conditional handover has been performed or from the serving cell, such that the next target cell can prepare for the handover.

According to embodiments, the cellular network is configured to send configuration data to the user equipment wherein the configuration data may comprise.
- Physical cell identities and/or
- RACH preambles and/or
- RACH occasions to use for initial connect and/or
- Back-off procedure when initial connect fails and/or
- User ID and/or RNTI and/or
- Trigger thresholds and/or
- Reference signals to measure on and/or
- Beam information and/or
- Averaging information and/or
- Target cell configuration and/or
- Resource pool configurations or usage/utilization for V2X and/or
- Physical location of the target cell.

According to embodiments, the cellular network is configured to send requests for a preparation of the handover from a serving cell at which the user equipment is currently served to target cells, wherein at least one of the target cells does not directly adjoin the serving cell.

According to embodiments, the cellular network is configured to send answers from the target cells to the serving cell.

According to embodiments, the cellular network is configured to make the user equipment trigger an update of the configuration data from a serving cell by sending a report informing the serving cell from the user equipment when the user equipment cannot perform a handover to one or more cells, if the user equipment is still connected to the serving cell, or informing a new serving cell from the user equipment about an erroneous handover configuration after the user equipment lost and re-connected to the cellular network.

According to embodiments, the cellular network is configured to make the user equipment trigger an update of the configuration data from the serving cell by sending a report, which may comprise a handover failure indication and/or
a positioning information of the user equipment and/or
a route information and/or
time stamp information and/or
signal strength measurement data associated with the user equipment with position and time information and/or
handover configuration and/or handover context configuration and/or information about cells in which handover context configuration are stored and/or
information about the last cell to which the user equipment was connected to and identity of the user equipment in this last cell and/or
information about the cell the user equipment was expected to perform a handover.

According to embodiments, the cellular network is configured to Inform the previous serving cell from the new serving cell about the re-connection and/or about the new handover and/or new context information and/or Inform previous one or more cells expecting the user equipment about the re-connection in order to free up resources reserved for the user equipment after the user equipment lost and re-connected to the cellular network.

According to embodiments, the cellular network is configured to Inform the serving cell from the user equipment in case of an erroneous handover configuration only by a failure indication and provide a detailed report only on the request of the serving cell.

According to embodiments, the cellular network is configured to trigger the user equipment from the serving cell to provide measurement data and/or measurement data.

According to embodiments, the cellular network is configured to check the trigger conditions from the user equipment related to the conditional handovers for non-configured target cells, and in case a non-configured target cell is a suitable handover candidate, inform the cellular network over the source cell from the user equipment about the suitable handover candidate.

According to embodiments, the cellular network is configured to initiate a handover from the user equipment to a non-configured cell if the trigger conditions of a conditional handover applies to the non-configured cell.

Implementation Alternatives

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer. Therefore, the digital storage medium may be computer readable.

Some embodiments according to the invention comprise a data carrier having electronically readable control signals, which are capable of cooperating with a programmable computer system.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user equipment supporting conditional handovers to cells of a cellular network, configured to
receive configuration data for configuring multiple conditional handovers as a sequence from the cellular network which indicates for a plurality of target cells of the cellular network, conditions to trigger a conditional handover to any of the target cells,
check the conditions with respect to appliance, and, in case of appliance, trigger the conditional handover; and
provide a measurement report and/or measurement data triggered by a serving source cell, giving information about which conditions caused one or more previous handovers.

2. The user equipment according to claim 1, configured to delete a first part of the configuration data and keep a second part of the configuration data after a conditional handover is completed,
wherein the first part of the configuration data relates to completed and/or finished handovers and
wherein the second the part of the configuration data relates to not yet completed or finished handovers.

3. The user equipment according to claim 1, configured to keep on the checking beyond a first triggering of the conditional handover,
wherein the first triggering relates to a conditional handover from a first cell to a second cell and
wherein the keeping on the checking comprises checking conditions with respect to a conditional handover from the second cell to the first cell and/or any other cell out of the target cells.

4. The user equipment according to claim 1, configured to trigger the conditional handover by sending a signal to a target cell and
complete the conditional handover by receiving a signal from the target cell.

5. The user equipment according to claim 1, configured to trigger the conditional handover available to the user equipment for a limited temporal interval indicated in the configuration data,
wherein the configuration data comprises a start time and an expiration time of the limited temporal interval, and
wherein the limited temporal interval is periodic or limited to a single time or once.

6. The user equipment according to claim 1, wherein the configuration data comprises a advantageous target cell configuration data and/or a backup target cell configuration data or is indicative of a preference with respect to conditional handovers to the target cells,
wherein the configuration data on a advantageous target cell and/or on a target cell with a first preference comprises different conditions than the configuration data on a backup target cell and/or on a target cell with a second preference, and wherein the conditions of the backup target cell configuration data and/or the configuration data of the target cell with the second preference comprise an initial condition that a handover with the advantageous target cell and/or the target cell with the first preference is failed.

7. The user equipment according to claim 1, configured to add, modify and/or release (320) the configuration data according to configuration updates received from the cellular network, wherein the configuration updates comprise a new version of the configuration data and/or only a changed portion of the configuration data.

8. The user equipment according to claim 1, configured to receive a first portion of the configuration data via broadcast or groupcast or multicast transmission, and a second portion of the configuration data via unicast transmission.

9. The user equipment according to claim 8 is configured to check the first and/or second portion of the configuration data and the first and/or second portion of the configuration data either comprises target cell configuration information indicating to the user equipment a following target cell configuration to be applied after the handover to the target cell, or the user equipment is configured to take over a serving source cell configuration information in case of the triggering of the handover.

10. The user equipment according to claim 8 is configured to check an update of the first portion of the configuration data and the first portion of the configuration data either comprises
Physical cell identities relating to target cells and/or
Target cell configuration parameters, e.g. frequency or carrier bandwidth, and/or
RACH preambles and/or
RACH occasions to use for an initial connect and/or
Back-off procedure when the initial connect fails and/or
Trigger thresholds, quantities and events indicating the conditions of the conditional handover to be executed and/or
Reference signals to measure specifies signals to measure and/or
Beam information and/or
Averaging information and/or
Physical location of the target cell; or the user equipment is configured to take over corresponding information from a current version of the first portion and/or a corresponding default information.

11. The user equipment according to claim 1, configured to receive configuration data wherein the configuration data comprises
Physical cell identities and/or
RACH preambles and/or
RACH occasions to use for an initial connect and/or
Back-off procedure when the initial connect fails and/or
User ID and/or RNTI and/or
Trigger thresholds, quantities and events indicating the conditions of the conditional handover to be executed and/or
Reference signals to measure on and/or
Beam information and/or
Averaging information and/or
Target cell configuration information and/or
Resource pool configurations or usage/utilization for V2X and/or
Physical location of the target cell.

12. The user equipment according to claim 1, configured to receive configuration data comprising or excluding information on
an expected time of a conditional handover discontinuity and/or
a predetermined target cell and/or
an announcement that a certain service and/or a QoS flow and/or a Logical Channel and/or a Radio Bearer is not supported in the target cell and/or
a network slice is not supported, if a predetermined target cell, adjoining one or more first target cells which adjoin each other and one or more second target cells which adjoin each other, but do not adjoin the first target cells, indicates to the cellular network that a continuity of the preparation of the conditional handover is unreliable.

13. The user equipment according to claim 1, configured to trigger an update of the configuration data from a serving source cell by sending a report
informing the serving source cell when the user equipment cannot perform a handover to one or more target cells, if the user equipment is still connected to the serving source cell, or
informing a new serving source cell about an erroneous handover configuration after the user equipment lost and re-connected to the cellular network;

wherein the report comprises
a handover failure indication and/or
a positioning information of the user equipment and/or
a route information and/or
time stamp information and/or
signal strength measurement data associated to physical cell identities and/or
handover configuration and/or handover context configuration and/or information about target cells in which handover context configuration are stored and/or
information about a last cell to which the user equipment was connected to and identity of the user equipment in the last cell and/or
information about the target cell the user equipment was expected to perform a handover.

14. The user equipment according to claim 1, configured to inform a serving source cell in case of an erroneous handover configuration only by a failure indication and
provide a detailed report only on a request of the serving source cell.

15. The user equipment according to claim 1, configured to provide measurement data triggered by a serving source cell.

16. The user equipment according to claim 1, wherein the configuration data comprises an expiration time after which another configuration and/or a pre-configuration or a default configuration is used, and
wherein the expiration time exceeds a radio link failure or the expiration time starts after the radio link failure.

17. A method for supporting conditional handovers comprising:
a user equipment receiving configuration data for configuring multiple conditional handovers as a sequence from a cellular network which indicates for a plurality of target cells of the cellular network, conditions to trigger a conditional handover to any of the target cells, the user equipment checking via a user equipment the conditions with respect to appliance, and, in case of appliance, triggering the conditional handover, and the user equipment providing a measurement report and/or measurement data triggered by a serving source cell, giving information about which conditions caused one or more previous handovers.

\* \* \* \* \*